(12) United States Patent
Goto et al.

(10) Patent No.: US 7,848,926 B2
(45) Date of Patent: Dec. 7, 2010

(54) SYSTEM, METHOD, AND PROGRAM FOR CORRECTING MISRECOGNIZED SPOKEN WORDS BY SELECTING APPROPRIATE CORRECTION WORD FROM ONE OR MORE COMPETITIVE WORDS

(75) Inventors: Masataka Goto, Tsukuba (JP); Jun Ogata, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 768 days.

(21) Appl. No.: 11/719,479

(22) PCT Filed: Nov. 18, 2005

(86) PCT No.: PCT/JP2005/021296

§ 371 (c)(1),
(2), (4) Date: Jul. 27, 2007

(87) PCT Pub. No.: WO2006/054724

PCT Pub. Date: May 26, 2006

(65) Prior Publication Data

US 2008/0052073 A1    Feb. 28, 2008

(30) Foreign Application Priority Data

Nov. 22, 2004    (JP)    ............................ 2004-338234

(51) Int. Cl.
*G10L 15/04*    (2006.01)
(52) U.S. Cl. ................... 704/251; 704/240; 704/235
(58) Field of Classification Search ............... 704/235, 704/240, 251, 257
See application file for complete search history.

(56) References Cited

U.S. PATENT DOCUMENTS 5,329,609 A * 7/1994 Sanada et al. ............... 704/251
5,829,000 A * 10/1998 Huang et al. ................ 704/252

(Continued)

FOREIGN PATENT DOCUMENTS

EP    1 471 502    10/2004

(Continued)

OTHER PUBLICATIONS

Wen Lin et al.; Study of an on-line, Adaptive speaker-independent word recognition system based on acoustic-phonetic analysis and statistical pattern recognition techniques; Acoustic, Speech, and Signal Processing, IEEE International Conference on ICASSP 1976, vol. 1, Publication year: 1976, Pares: 194-197.*

(Continued)

*Primary Examiner*—Abul Azad
(74) *Attorney, Agent, or Firm*—Rankin, Hill & Clark LLP

(57) ABSTRACT

A speech recognition system is provided where a user may more efficiently and easily correct a recognition error resulting from speech recognition. The system compares multiple inputted words with multiple stored words and determines a most-competitive word candidate. The system selects one or more competitive words that have competitive probabilities close to the competitive probability of the most-competitive word candidate and displays the one or more competitive words adjacent to the most-competitive word candidate. The system selects an appropriate correction word from the one or more competitive words and replaces one of the most-competitive word candidate with the correction word.

11 Claims, 26 Drawing Sheets

U.S. PATENT DOCUMENTS

| | | | | |
|---|---|---|---|---|
| 6,662,160 | B1 * | 12/2003 | Chien et al. | 704/256 |
| 6,754,625 | B2 * | 6/2004 | Olsen et al. | 704/235 |
| 2002/0133340 | A1 * | 9/2002 | Basson et al. | 704/235 |
| 2002/0165716 | A1 * | 11/2002 | Mangu et al. | 704/255 |

FOREIGN PATENT DOCUMENTS

| | | |
|---|---|---|
| JP | 58-076944 | 5/1983 |
| JP | 01-197797 | 8/1989 |
| JP | 06-301395 | 10/1994 |
| JP | 09-258786 | 10/1997 |
| JP | 2000-099084 | 4/2000 |
| JP | 2002-287792 | 10/2002 |
| JP | 2002-297181 | 10/2002 |
| JP | 2003-005789 | 1/2003 |
| JP | 2003-295884 | 10/2003 |
| JP | 2003-316384 | 11/2003 |
| JP | 2004-309928 | 11/2004 |
| JP | 2005-234236 | 9/2005 |

OTHER PUBLICATIONS

Qiang Huo et al.; On-line adaptive learning of correlated continuous density hidden Markov models for speech recognition, Speech and Audio Processing, IEEE Transaction on, vol. 6, Issue 4, Publication year 1998, pp. 386-397.*

Lidia Mangu et al., "Finding consensus in speech recognition: word error minimization and other applications of confusion networks2", Computer Speech and language, vol. 14, No. 4, Oct. 2000, pp. 373 to 400.

Akio Ando et al., "A Simultaneous Subtitling System for Broadcast News Programs with a Speech Recognizer", D-II vol. J84-DII, No. 6, pp. 877-887, 2001.

Ogata et al., Onsei Tesei: 'Choice' on Speech, Information Processing Society of Japan, vol. 2004, No. 131, 2004-SLP-54, pp. 319 to 324, Dec. 20, 2004.

Endo et al., Onsei Nyuryoku ni Okeru Taiwaterki Koho Sentaku Shuho, Interaction 2003, Information Processing Society of Japan Symposium Series, vol. 2003, No. 7, pp. 195 to 196, Feb. 27, 2003.

Ogata, Jun and Ariki, Yasuo; "Unsupervised Acoustic Model Adaptation Based on Phoneme Error Minimization"; The Transactions of the Institute of Electronics Information and Communication Engineers, Dec. 2002, vol. J85-D-2, No. 12, pp. 1771-1780. (English Abstract Included).

Ogata, Jun and Ariki, Yasuo; "Unsupervised Adaptation of an Acoustic Model Using Confidence Measures Based on Phoneme Posterior Probabilities"; IPSJ SIG Notes, Dec. 21, 2001, vol. 2001, No. 123, pp. 129-134, Information Processing Society of Japan. (English Abstract Included).

* cited by examiner

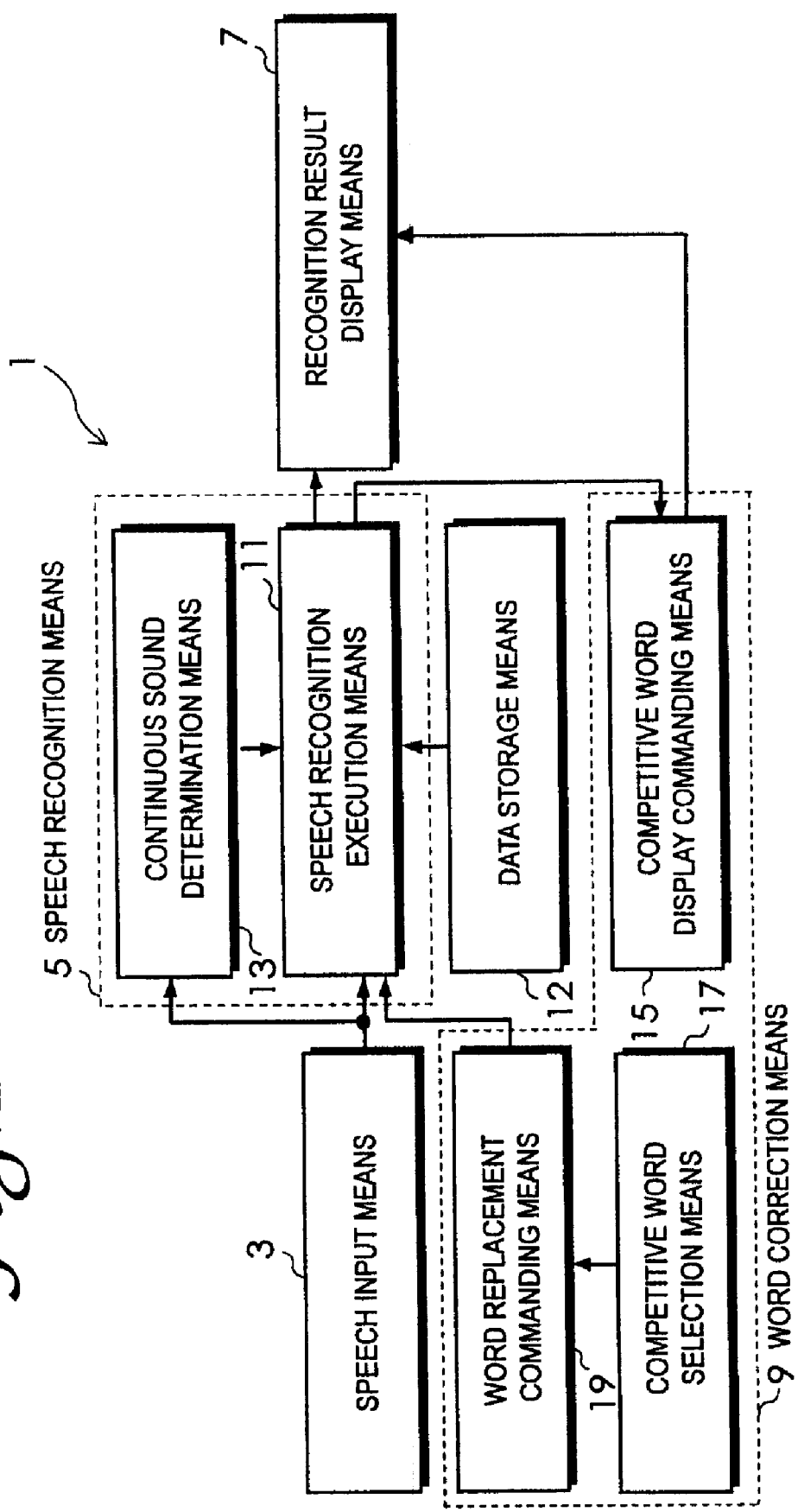

Fig.2

|  | | | | | | |
|---|---|---|---|---|---|---|
| USUAL RECOGNITION RESULT | 温泉 (ONSEN) (HOT SPRING) | 認識 (NINSHIKI) (RECOGNITION) | は (WA) (IS) | 誤り (AYAMARI) (ERROR) | を (WO) (-) | 起こす (OKOSU) (PRONE) |
| COMPETITIVE CANDIDATE | 音声 (ONSEI) (SPEECH) | | が (GA) (IS) | | と (TO) (-) | 降ろす (OROSU) (LOWER) |
| | お酢 (OSU) (VINEGAR) | | に (NI) (TO) | | | 犯す (OKASU) (COMMIT) |
| | | | | | | |
| | オス (OSU) (MALE) | | | | | |

⇩ SELECTION OF CANDIDATE BY USER

| 温泉 (ONSEN) (HOT SPRING) | 認識 (NINSHIKI) (RECOGNITION) | は (WA) (IS) | 誤り (AYAMARI) (ERROR) | を (WO) (-) | 起こす (OKOSU) (PRONE) |
|---|---|---|---|---|---|
| 音声 (ONSEI) (SPEECH) ← | | が (GA) (IS) | | と (TO) (-) | 降ろす (OROSU) (LOWER) |
| お酢 (OSU) (VINEGAR) | | に (NI) (TO) | | | 犯す (OKASU) (COMMIT) |
| | | | | | |
| オス (OSU) (MALE) | | | | | |

Fig.19A

| 温泉 (ONSEN) (HOT SPRING) | 入浴 (NYUYOKU) (BATHING) | インターフェース (INTAFEISU) (INTERFACE) | は (WA) (IS) | 訳 (YAKU) (TRANSLATION) | に (NI) (-) | 立ち (TACHI) (STAND) | ます (MASU) (IS) | か (KA) (?) |
|---|---|---|---|---|---|---|---|---|
| 温泉 (ONSEN) (HOT SPRING) | 入浴 (NYUYOKU) (BATHING) | インターフェース (INTAFEISU) (INTERFACE) | は (WA) (IS) | 訳 (YAKU) (TRANSLATION) | に (NI) (-) | 立ち (TACHI) (STAND) | ます (MASU) (IS) | か (KA) (?) |
| 音声 (ONSEI) (SPEECH) | 入力 (NYURYOKU) (INPUT) | | が (GA) (IS) | 役 (YAKU) (PART) | | | まし (MASHI) (IS) | から (KARA) (BECAUSE) |
| 本選 (HONSEN) (MAIN SELECTION) | 有力 (YURYOKU) (DOMINANT) | | の (NO) (OF) | | 十 (JU) (TEN) | 達し (TASSI) (REACH) | たちまち (TACHIMACHI) (RIGHT AWAY) | |
| 本戦 (HONSEN) (MAIN WAR) | | | | 約 (YAKU) (ABOUT) | | たち (TACHI) (-) | | |
| 混戦 (KONSEN) (SCRAMBLE) | | | を (WO) (-) | 薬 (YAKU) (DRUG) | | 世紀 (SEIKI) (CENTURY) | | |
| 大勢 (TAISEI) (GENERAL SITUATION) | | | | 音楽 (ONGAKU) (MUSIC) | | | | |
| | | | | 役員 (YAKUIN) (DIRECTOR) | | | | |
| 大 (OO) (GREAT) | | | | | | | | |
| 王位 (OUI) (THRONE) | | | | | | | | |

Fig.19B

| 音声<br>(ONSEI)<br>(SPEECH) | 入力<br>(NYURYOKU)<br>(INPUT) | インターフェース<br>(INTAFEISU)<br>(INTERFACE) | は<br>(WA)<br>(IS) | 役<br>(YAKU)<br>(PART) | に<br>(NI)<br>(-) | 立ち<br>(TACHI)<br>(STAND) | ます<br>(MASU)<br>(IS) | か<br>(KA)<br>(?) |
|---|---|---|---|---|---|---|---|---|
| 温泉<br>(ONSEN)<br>(HOT SPRING) | 入浴<br>(NYUYOKU)<br>(BATHING) | | | | | | | |
| 音声<br>(ONSEI)<br>(SPEECH) | 入力<br>(NYURYOKU)<br>(INPUT) | インターフェース<br>(INTAFEISU)<br>(INTERFACE) | は<br>(WA)<br>(IS) | 訳<br>(YAKU)<br>(TRANSLATION) | に<br>(NI)<br>(-) | 立ち<br>(TACHI)<br>(STAND) | ます<br>(MASU)<br>(IS) | か<br>(KA)<br>(?) |
| | | | が<br>(GA)<br>(IS) | 役<br>(YAKU)<br>(PART) | | | まし<br>(MASHI)<br>(IS) | から<br>(KARA)<br>(BECAUSE) |
| 大<br>(OO)<br>(GREAT) | | | の<br>(NO) | | | | | |
| 本選<br>(HONSEN) | 有力<br>(YURYOKU) | | | | ＋ | 達し<br>(TASSI) | たちまち<br>(TACHIMACHI) | |
| 王位<br>(OUI) | | | | | | | | |

Fig. 20A

| 度(DO)(TIMES) | の(NO)(OF) | 名手(MEISHU)(EXPERT) | | より(YORI)(MORE) | |
|---|---|---|---|---|---|
| 三(SAN)(THREE) | | | | | |
| 度(DO)(TIMES) | の(NO)(OF) | 名手(MEISHU)(EXPERT) | 十(JU)(TEN) | より(YORI)(MORE) | いい(II)(GOOD) |
| 三(SAN)(THREE) | | | | | |
| スタンド(SUTANDO)(STAND) | も(MO)(ALSO) | 兵士(HEISHI)(SOLDIER) | | 五(GO)(FIVE) | 良い(YOI)(GOOD) |
| サイド(SAIDO)(SIDE) | 党(TOU)(PARTY) | 飯(MESHI)(MEAL) | | を(WO)(-) | |
| 賛同(SANDOU)(ASSENT) | トン(TON)(TON) | 名刺(MEISHI)(BUSINESS CARD) | | | |
| | | 道(MICHI)(WAY) | | | |
| | | 意思(ISHI)(INTENT) | | | |

Fig. 20B

| 三<br>(SAN)<br>(THREE) | 度<br>(DO)<br>(TIMES) | の<br>(NO)<br>(OF) | 飯<br>(MESHI)<br>(MEAL) | | より<br>(YORI)<br>(MORE) | |
|---|---|---|---|---|---|---|
| 三<br>(SAN)<br>(THREE) | 度<br>(DO)<br>(TIMES) | の<br>(NO)<br>(OF) | 名手<br>(MEISHU)<br>(EXPERT) | | より<br>(YORI)<br>(MORE) | いい<br>(II)<br>(GOOD) |
| スタンド<br>(SUTANDO)<br>(STAND) | | も<br>(MO)<br>(ALSO) | 兵士<br>(HEISHI)<br>(SOLDIER) | 十<br>(JU)<br>(TEN) | 五<br>(GO)<br>(FIVE) | |
| サイド<br>(SAIDO)<br>(SIDE) | 党<br>(TOU)<br>(PARTY) | | 飯<br>(MESHI)<br>(MEAL) | | を<br>(WO)<br>(-) | 良い<br>(YOI)<br>(GOOD) |

*Fig. 20C*

| 三 (SAN) (THREE) | 度 (DO) (TIMES) | の (NO) (OF) | 飯 (MESHI) (MEAL) | | より (YORI) (MORE) | | 温水 (ONSUI) (WARM WATER) | 式 (SHIKI) (EXPRESSION) |
|---|---|---|---|---|---|---|---|---|
| 三 (SAN) (THREE) | 度 (DO) (TIMES) | の (NO) (OF) | 名手 (MEISHU) (EXPERT) | | より (YORI) (MORE) | | 温水 (ONSUI) (WARM WATER) | 式 (SHIKI) (EXPRESSION) |
| スタンド (SUTANDO) (STAND) | | も (MO) (ALSO) | 兵士 (HEISHI) (SOLDIER) | 十 (JU) (TEN) | 五 (GO) (FIVE) | いい (II) (GOOD) | 音声 (ONSEI) (SPEECH) | 実施 (JISSHI) (IMPLEMENTATION) |
| サイド (SAIDO) (SIDE) | 党 (TOU) (PARTY) | | 飯 (MESHI) (MEAL) | | を (WO) (-) | 良い (YOI) (GOOD) | 大西 (OHNISHI) (OHNISHI) | 聖域 (SEIIKI) (SANCTUARY) |
| 賛同 (SANDOU) (ASSENT) | トン (TON) (TON) | | 名刺 (MEISHI) (BUSINESS CARD) | | | | 当選 (TOUSEN) (ELECT) | 認識 (NINSHIKI) (RECOGNITION) |
| | | | 道 (MICHI) (WAY) | | | | 本戦 (HONSEN) (MAIN WAR) | 資本 (SHIHON) (CAPITAL) |
| | | | 意思 (ISHI) (INTENT) | | | | | 主義 (SHUGI) (DOCTRINE) |

Fig. 20D

| 三 (SAN) (THREE) | 度 (DO) (TIMES) | の (NO) (OF) | 飯 (MESHI) (MEAL) |  | より (YORI) (MORE) |  | 音声 (ONSEI) (SPEECH) | 認識 (NINSHIKI) (RECOGNITION) |
|---|---|---|---|---|---|---|---|---|
| 三 (SAN) (THREE) | 度 (DO) (TIMES) | の (NO) (OF) | 名手 (MEISHU) (EXPERT) |  | より (YORI) (MORE) |  | 温水 (ONSUI) (WARM WATER) | 式 (SHIKI) (EXPRESSION) |
| スタンド (SUTANDO) (STAND) |  | も (MO) (ALSO) | 兵士 (HEISHI) (SOLDIER) | 十 (JU) (TEN) | 五 (GO) (FIVE) | いい (II) (GOOD) | 音声 (ONSEI) (SPEECH) | 実施 (JISSHI) (IMPLEMENTATION) |
| サイド (SAIDO) (SIDE) | 党 (TOU) (PARTY) |  | 飯 (MESHI) (MEAL) |  | を (WO) (-) | 良い (YOI) (GOOD) | 大西 (OHNISHI) (OHNISHI) | 聖域 (SEIIKI) (SANCTUARY) |
| 賛同 (SANDOU) (ASSENT) | トン (TON) (TON) |  | 名刺 (MEISHI) (BUSINESS CARD) |  |  |  | 当選 (TOUSEN) (ELECT) | 認識 (NINSHIKI) (RECOGNITION) |

Fig.22
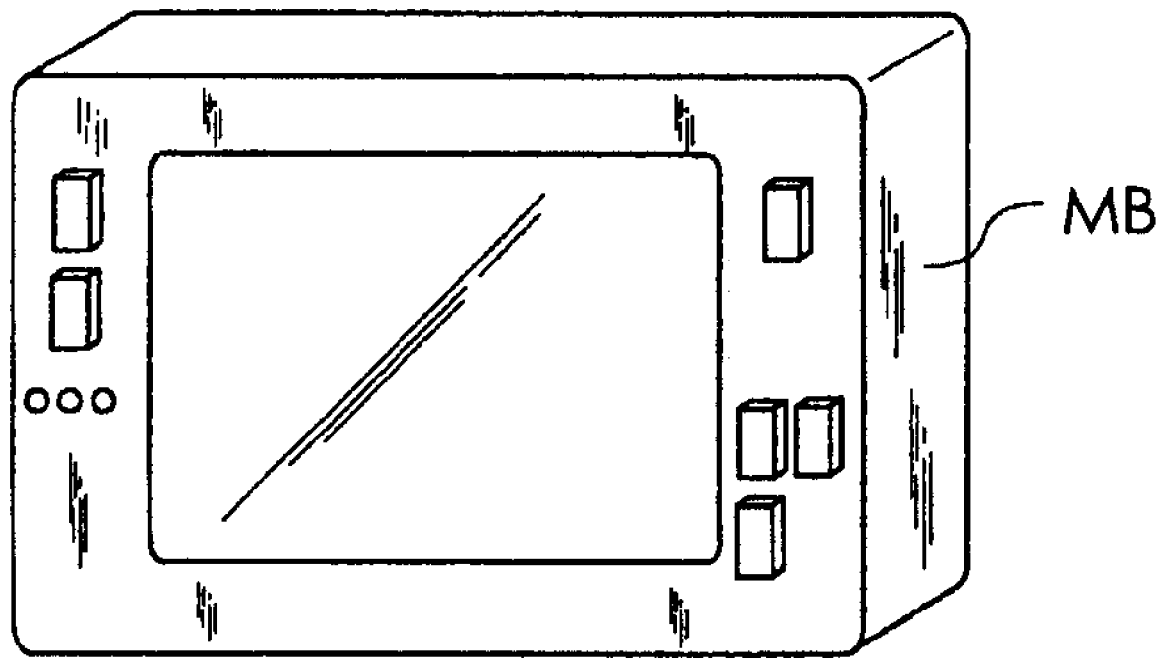
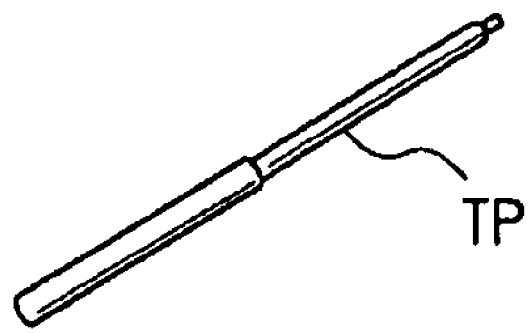

SYSTEM, METHOD, AND PROGRAM FOR CORRECTING MISRECOGNIZED SPOKEN WORDS BY SELECTING APPROPRIATE CORRECTION WORD FROM ONE OR MORE COMPETITIVE WORDS

TECHNICAL FIELD

The present invention relates to a speech recognition system, a speech recognition method, and a program that allows correction of a speech recognition result displayed on a screen.

BACKGROUND ART

It has been traditionally known that speech recognition by a computer always causes a recognition error. As seen from wrong hearing of other person's talk, even a human being cannot recognize speech 100 percent correctly. This is because human speech includes an utterance that is mistakable for other word, an utterance including a homonym, or an unclear utterance. A problem of such erroneous recognition (wrong hearing) is easily solved by a speech dialogue between human beings. However, between a computer and a human being, it is difficult to perform such a flexible speech dialogue between the human beings. No matter how a speech recognition technique is improved to increase a recognition rate, the recognition rate will never reach 100%. It is because always continuing to give a clear and unambiguous utterance is extremely difficult for a human being. Accordingly, in order to fabricate a speech recognition system by which speech recognition can be routinely used, it is essential to allow erroneous recognition that would always occur somewhere to be easily corrected.

Various techniques for correcting a result of recognition have been therefore proposed up to now. In commercially available dictation software, for example, when a user sees a text display of a recognition result and then discovers erroneous recognition, he can specify a segment of the erroneous recognition by an operation using a mouse or a voice input. Then, other candidates for the segment of the erroneous recognition are displayed. The user can thereby select a correct candidate and correct the segment of the erroneous recognition. In a technique disclosed in Nonpatent Document 1, the technique as described above is developed, and a recognition result of a speech separated by word boundary lines is displayed after completion of the speech. Then, it is arranged that boundaries of words may be shifted using a mouse in such a manner that segmentation of the words is modified by kana-kanji conversion. In this case, a possibility that a correct candidate can be fetched up has increased. However, time and effort for correcting erroneous recognition by the user, such as specification of a location of the erroneous recognition, change of a word boundary, and selection of a candidate, have increased. On the other hand, in a technique disclosed in Nonpatent Document 2, a practical recognition error correction system is implemented for subtitled broadcasting for news programs that utilizes speech recognition. This technique, however, assumes division of labor by two persons. It is necessary for one person to discover and marks a location of erroneous recognition, and it is necessary for another person to type a correct word into the location of erroneous recognition. Accordingly, an individual cannot use this technique in order to correct input of his speech. As described above, both of the conventional arts require time and effort: the user first discovers and points out a location of erroneous recognition, and next the user determines and selects other candidate for the location of erroneous recognition, or corrects the location of erroneous recognition by typing.

Patent Document 1 (Japanese Patent Publication No. 2002-287792) discloses a technique in which correction of speech recognition is performed by a voice input. Patent Document 2 (Japanese Patent Publication No. 2004-309928) discloses an electronic dictionary system that has a function of displaying a plurality of output candidates on a display portion when there are the output word candidates resulting from speech recognition, and instructing a speaker to select a desired word from among the output word candidates. Patent Document 3 (Japanese Patent Publication No. 2002-297181) and Patent Document 4 (Japanese Patent Publication No. 06-301395) disclose a technique of using a confusion matrix in order to improve a recognition rate of speech recognition.

Nonpatent Document 1: Endo and Terada: "Candidate selecting interface for speech input", In proceedings of Interaction 2003, pp 195-196, 2003.

Nonpatent Document 2: Ando et al.: "A Simultaneous Subtitling System for Broadcast News Programs with a Speech Recognizer", The Transactions of the Institute of Electronics, Information and Communication Engineers, vol. J84-D-II, No. 6, pp. 877-887, 2001.

Patent Document 1: Japanese Patent Publication No. 2002-287792

Patent Document 2: Japanese Patent Publication No. 2004-309928

Patent Document 3: Japanese Patent Publication No. 2002-297181

Patent Document 4: Japanese Patent Publication No. 11-311599

DISCLOSURE OF THE INVENTION

Problem to be Solved by the Invention

In the conventional speech recognition techniques, a recognition error resulting from speech recognition cannot be efficiently and easily corrected by a user.

An object of the present invention is to provide a speech recognition system, a speech recognition method, and a program in which the user may efficiently and easily correct a recognition error resulting from speech recognition.

Other object of the present invention is to provide a speech recognition system, a speech recognition method, and a program in which during speech input or after speech input, just by selecting a correct candidate, correction may be made.

Other object of the present invention is to provide a speech recognition system, a speech recognition method, and a program in which, even if the user does not discover and point out a location of erroneous recognition, a competitive word candidate is always displayed on a screen in real time and an opportunity for correction may be thereby secured.

Still other object of the present invention is to provide a speech recognition system, a speech recognition method, and a program that allow immediate visual recognition of ambiguity in a recognition result of a word, according to the number of competitive candidates for the word displayed on the screen.

Other object of the present invention is to provide a speech recognition system, a speech recognition method, and a program that allow efficient correction of a speech recognition result of a word just by simultaneously viewing the speech recognition result and competitive candidates for the word and selecting a correct candidate, without spending time and effort in discovering and pointing out a location of erroneous recognition, making determination as to the presented candidates, and selecting the correct candidate.

Another object of the present invention is to provide a speech recognition system, a speech recognition method, and a program that allow suspension of speech recognition at any desired time by uttering a specific sound during speech input.

Means for Solving the Problem

A speech recognition system of the present invention comprises speech input means for inputting a speech; speech recognition means; recognition result display means; and word correction means. The speech input means is constituted by including a signal converter or the like that converts an analog signal from a microphone to a digital signal that may undergo signal processing. A specific configuration of the speech input means is arbitrary.

The speech recognition means has a speech recognition function of comparing a plurality of words included in the speech input from the speech input means with a plurality of words stored in dictionary means, respectively, and determining a most-competitive word candidate having a highest competitive probability as a recognition result from among competitive candidates in respective of each of the plurality of words included in the speech, by means of a predetermined determination method.

As the "predetermined determination method," various determination methods which are known may be herein employed. Preferably, a determination method is employed in which a word graph based on the inputted speech is divided into a plurality of word segments condensed into a linear format by acoustic clustering, by means of a confusion network, competitive probabilities, which will be described later, are determined for each of the word segments, and then the most-competitive word candidates are determined for each of the word segments. When the confusion network is employed, effective candidate presentation and correction becomes possible with respect to various inputted speeches, regardless of whether the speech is composed of a large vocabulary or a small vocabulary of words.

The recognition result display means has a function of displaying the recognition result recognized by the speech recognition means on a screen as a word sequence comprising the most-competitive word candidates. Preferably, the recognition result display means has a function of displaying the result of recognition by the speech recognition means on the screen in real time.

Then, the word correction means has a word correction function of correcting one of the words with highest competitive probabilities constituting the word sequence displayed on the screen. The word correction means is constituted by competitive word display commanding means, competitive word selection means, and word replacement commanding means. The competitive word display commanding means has a competitive word display function of selecting of one or more competitive words having competitive probabilities close to the highest competitive probability of the most-competitive word candidate from among the competitive candidates, and displaying of the one or more competitive words adjacent to the most-competitive word candidate, on the screen. The competitive word selection means has a competitive word selection function of selecting an appropriate correction word from the one or more competitive words displayed on the screen in response to a manual operation by a user. Then, the word replacement commanding means has a word replacement commanding function of commanding the speech recognition means to replace the most-competitive word candidate recognized by the speech recognition means with the appropriate correction word selected by the competitive word selection means.

In the speech recognition system having the configuration described above, as competitive candidates for correcting the most-competitive word candidates constituting the word sequence displayed on the screen, the one or more competitive words having the competitive probabilities close to the highest competitive probability of the most-competitive word candidate are selected from among the competitive candidates, and the one or more competitive words are displayed adjacent to the most-competitive word candidate, on the screen. Then, when the appropriate correction word is selected from among the one or more competitive words displayed on the screen in response to the manual operation by the user, the most-competitive word candidate recognized by the speech recognition means is replaced with the correction word. Consequently, according to the present invention, while viewing the word sequence displayed on the screen as the recognition result, the correction word may be selected from among the one or more competitive words displayed in the vicinity of the most-competitive word candidate for which it is determined correction should be made, and then the correction may be made. Thus, the correction may be made in a short time. Accordingly, correction of the recognition result may be performed, concurrently with speech recognition.

No particular limitation is imposed on a method of determining the number of the one or more competitive words to be displayed on the screen, and an arbitrary method may be employed. However, the lower ambiguity of the speech recognition is, the fewer competitive words are displayed. The higher the ambiguity of speech recognition becomes, the more competitive words will be displayed. Then, it is preferable that the competitive word display commanding means is configured to determine the number of competitive words to be displayed on the screen according to a distribution status of competitive probabilities of the competitive words. When there is only one word with a high competitive probability, for example, the one word should be displayed as a competitive word. On the contrary, when there are a large number of words with high competitive probabilities, the number of competitive words to be displayed in a possible range should be increased in view of the distribution status of the competitive probabilities. With this arrangement, necessity of correction can be seen at a glance by the number of displayed competitive words. Thus, it is not necessary for the user to give the same attention to all words in a word sequence to correct the word. For this reason, the time required for making determination as to the necessity of correction of a word and correcting the word may be reduced. In order to achieve such an effect, it should be so arranged that the competitive word display commanding means reduces the number of the competitive words to be displayed on the screen when the number of the competitive words having the competitive probabilities close to the highest competitive probability of the most-competitive word candidate is small, and increases the number of the competitive words to be displayed on the screen when there are a large number of the competitive words having the competitive probabilities close to the highest competitive probability of the most-competitive word candidate the most-competitive word candidate.

It is also preferable that the competitive word display commanding means has an additional function of displaying the competitive words so that the competitive words are displayed in a descending order of the competitive probabilities above or below the most-competitive word candidate included in the word sequence. When the competitive word display demanding means has such a function, a word required for correction may be easily found from a competitive word close to the word targeted for correction, in a short time. The time for correcting the word may be further reduced.

Preferably, the competitive word display commanding means has a function of adding in the competitive words a deletion candidate that allows selecting deletion of one of the most-competitive word candidate from the recognition result because the one of the most-competitive word candidates is unnecessary. In this case, the word replacement commanding means should have a function of commanding the speech recognition means to delete the most-competitive word candidate corresponding to the deletion candidate from the recognition result recognized by the speech recognition means, when the deletion candidate is selected. With this arrangement, a false alarm (word which is not uttered but recognized as if it were uttered, and then displayed) that may often occur in speech recognition may be deleted with an operation which is substantially the same as competitive word selection. Accordingly, the time required for the correction will be further reduced. When a competitive probability is assigned to a deletion candidate as well, a display position of the deletion candidate will not be fixed. For this reason, selection of a competitive word and selection of deletion of a word from the word sequence may be executed at the same level. The time required for the correction by the user may be therefore further reduced.

When the deletion candidate is employed, assume that, as the determination method, a method is particularly employed where a word graph based on the inputted speech is divided into a plurality of word segments condensed into a linear format by acoustic clustering, by means of a confusion network, the competitive probabilities are determined for each of the word segments, and then the most-competitive word candidates are determined for each of the word segments. Then, it is preferable that the following arrangement be made: when a sound constituting a portion of the word may be included in both of two word segments, the sound constituting the portion of the word is included in one of the two word segments, and when the word belonging to the one of the two word segments is corrected by the word correction means, the deletion candidate is automatically selected for the other of the two word segments so that temporal consistency is achieved in the other of the two word segments. With this arrangement, a false alarm in the word segment adjacent to the word segment for which the correction has been made may be automatically deleted, and the number of corrections by the user may be minimized.

Preferably, the recognition result display means has a function of displaying the recognition result on the screen in real time. In this case it is preferable that the word correction means also have a function of displaying the one or more competitive words on the screen in real time, together with the display of the recognition result recognized by the recognition result display means on the screen. With this arrangement, correction of speech recognition may be performed concurrently with utterance of the user.

When correction of a word is performed, a competitive word determined earlier than the correction may become inappropriate in terms of a relationship with the corrected word. Then, it is preferable that the competitive word display commanding means be provided with a function whereby when the most-competitive word candidate is corrected by the word correction means, the corrected word obtained by the correction by the user is determined as an originally correct word in the word sequence, and one or more competitive words are selected again. When this function is provided, the competitive candidates for the most-competitive word candidate, which has not been corrected yet, may be replaced with those words suited to the word corrected by the user. Thus, subsequent corrections may be facilitated. In this case, it is preferable that the competitive word display commanding means is further provided with the following function. In other words, it is preferable that the competitive word display commanding means is provided with the function whereby linguistic connection probabilities between the corrected word and each of two words locatable before and after a corrected word in a word sequence and between the corrected word and each of one or more competitive words for each of these two words are calculated, one or more competitive words each with the connection probability are selected to display in descending order of the connection probabilities as the one or more competitive words to be displayed on the screen, and one or more competitive words displayed earlier on the screen are replaced with the selected one or more competitive words, or the selected one or more competitive words are added to the one or more competitive words displayed earlier on the screen. With this arrangement, in conjunction with correction of a word in the word sequence, more appropriate words may be displayed as competitive words for two words adjacent to the corrected word. The correction operation will be further facilitated.

Preferably, the speech recognition means has an additional function of storing the word corrected by the word correction means, information on a correction time, and a posterior probability of the corrected word as accumulated data, and performing the speech recognition again using the accumulated data. Assume that such a function is added. Then, there is an advantage that even when an intended correct word cannot be obtained as a competitive candidate in a certain word segment in a first recognition, by using speech recognition that utilizes new information obtained from correction processing by the user, the intended correct word may be presented as a recognition result or the competitive candidate to the user.

The speech recognition means may be provided with a function of suspending speech recognition by input of a specific sound or voice uttered by a speaker during input of the speech, and allowing correction by the word correction means. When such a function is provided, speech recognition may be suspended by utterance of a specific sound when it needs time for a correction. The user may therefore perform the correction of a word at his pace, without being impatient. In this case, continuous sound determination means for determining that the speech input is a continuous sound continuing for a given time or more, for example, is provided at the speech recognition means. Then, the speech recognition means should be provided with a function of suspending the speech recognition processing when the continuous sound determination means determines input of the continuous sound, and resuming the speech recognition from a state before the suspension when the continuous sound determination means determines input of a sound other than the continuous sound after the determination of the continuous sound by the continuous sound determination means. With this arrangement, it becomes possible to smoothly suspend speech recognition, using a filled pause (lengthened pronunciation of a sound pronounced when the speaker chokes up) often made when the speaker chokes up in an ordinary conversation.

Preferably, the speech recognition means has a function of storing the word corrected by the word correction means, positional or time information in the word of the inputted speech, and dynamically strengthening a linguistic probability of the word in the stored positional or time information with the speech recognition performed again, thereby facilitating recognition of a word associated with the word. It is also preferable that the speech recognition means includes acoustic adaptive processing means for performing speech recognition processing and also performing online acoustic adaptive processing using the recognition result of the speech recognition processing as a teacher signal, when the speech is input. When the acoustic adaptive processing means as described above is provided, immediate adaptation to a speech of the user being currently used, a recording environment, or the like may be made, and basic performance of speech recognition itself may be thereby improved.

Then, as the acoustic adaptive processing means, it is preferable to use the means that has a highly accurate acoustic adaptive function through real-time generation of the teacher signal free of a recognition error and being accurate by the word correction means. When the acoustic adaptive processing means as described above is used, degradation of adaptive performance caused by a recognition error in the teacher signal, which has been a problem in conventional online adaptation, may be minimized.

In a speech recognition method of the present invention executed by the speech recognition system of the present invention, a speech recognition step, a recognition result display step, and a word correction step are executed. In the speech recognition step, a plurality of words included in a speech input are compared with a plurality of words stored in dictionary means, respectively, and a most-competitive word candidate having the highest competitive probability is determined as a recognition result from among competitive candidates in respect of each of the plurality of words included in the speech, by means of a predetermined determination method. In the recognition result display step, the recognition result recognized by the speech recognition means is displayed on a screen as a word sequence comprising the most-competitive word candidates. Then, in the word correction step, the most-competitive word candidate constituting the word sequence displayed on the screen is corrected. In the word correction step, a competitive word display step of selecting one or more competitive words having competitive probabilities close to the highest competitive probability of the most-competitive word candidate from among the competitive candidates and displaying on the screen the one or more competitive words adjacent to the most-competitive word candidate; a competitive word selection step of selecting an appropriate correction word from the one or more competitive words displayed on the screen in response to a manual operation by a user; and a word replacement step of replacing the most-competitive word candidate recognized by the speech recognition step with the appropriate correction word selected by the competitive word selection step are executed.

A program (computer program) of the present invention using a computer, for causing the computer to execute a function of recognizing a speech and displaying on a screen a recognition result by characters, causes the computer to execute: a speech recognition function of comparing a plurality of words included in a speech input with a plurality of words stored in dictionary means, respectively, and determining a most-competitive word candidate having the highest competitive probability as a recognition result from among competitive candidates in respect of each of the plurality of words included in the speech; a recognition result display function of displaying the recognition result recognized by the speech recognition function on the screen as a word sequence comprising the most-competitive word candidate; and a word correction function of correcting the most-competitive word candidate in the word sequence displayed on the screen. The word correction function causes the computer to execute: a competitive word display function of selecting one or more competitive words having competitive probabilities close to the highest competitive probability of the most-competitive word candidate from among the competitive candidates and displaying on the screen the one or more competitive words adjacent to of the most-competitive word candidate; a competitive word selection function of selecting an appropriate correction word from the one or more competitive words displayed on the screen in response to a manual operation by a user; and a word replacement function of replacing the most-competitive word candidate recognized by the speech recognition means with the appropriate correction word selected by the competitive word selection means and displaying the correction word on the screen.

Effect of the Invention

According to the present invention, while viewing a word sequence displayed on the screen as a recognition result, by selecting a correction word from among one or more competitive words displayed close to a word for which it is determined correction should be made, the correction may be made. The correction may be therefore made in a short time. Consequently, according to the present invention, correction of a recognition result may be made, concurrently with speech recognition.

BRIEF DESCRIPTION OF THE DRAWINGS

FIG. 1 is a block diagram schematically showing function implementation means implemented within a computer when an embodiment of a speech recognition system of the present invention that executes a speech recognition method and a program according to the present invention is implemented, using the computer.

FIG. 2 is a diagram showing a display state of competitive candidates in the embodiment.

FIGS. 19A and 19B are diagrams each showing an example of a display screen when the intentional suspension function is not used.

FIGS. 20A through 20D are diagrams each showing a display screen when the intentional suspension function is used.

FIG. 22 is a diagram showing a portable terminal system that may be used for carrying out the present invention.

DESCRIPTION OF REFERENCE NUMERALS

Figure 3:
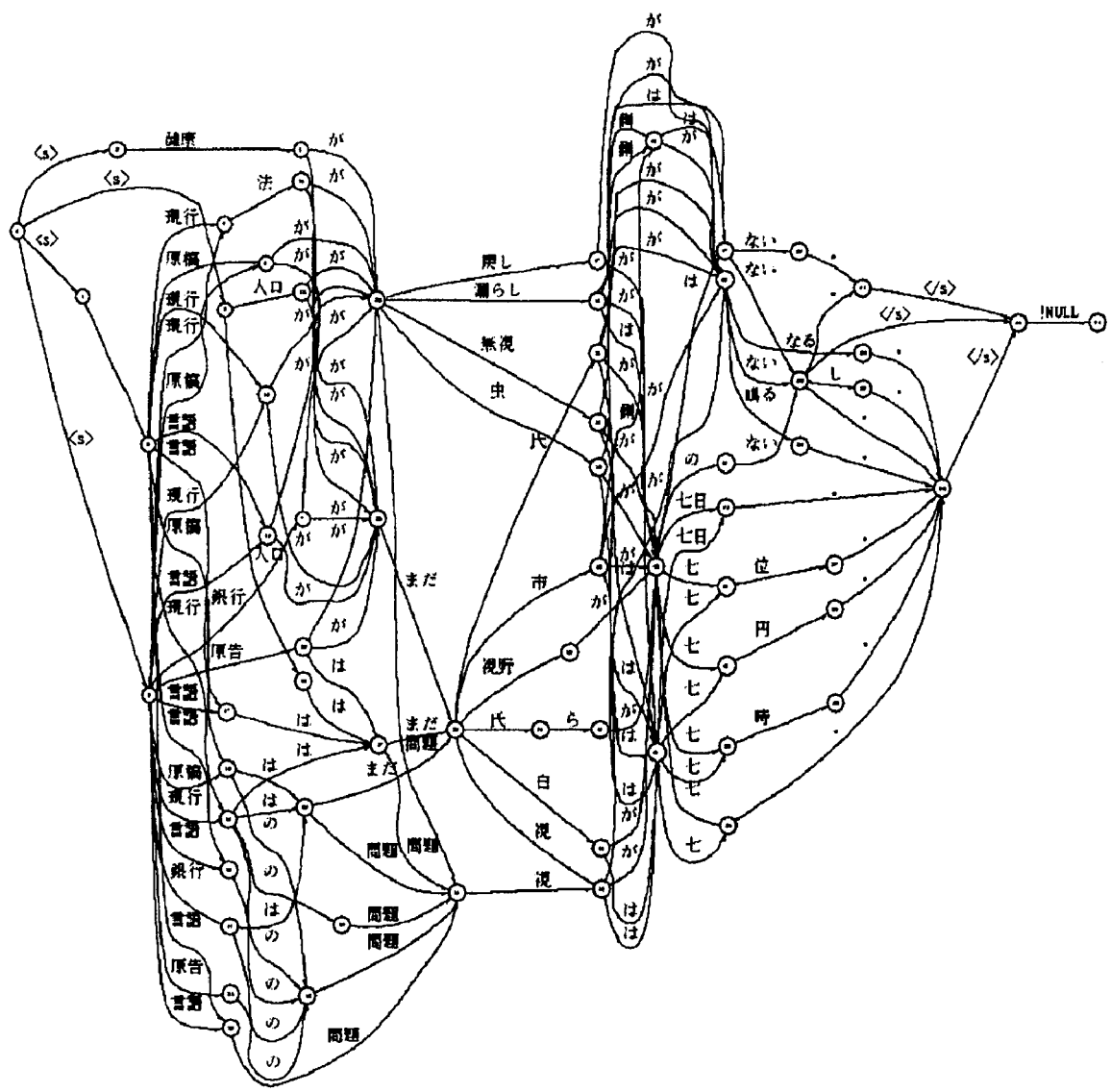
FIG. 3 is a diagram showing an example of a word graph which is an intermediate result commonly used in speech recognition.

1 SPEECH RECOGNITION SYSTEM
3 SPEECH INPUT MEANS
5 SPEECH RECOGNITION MEANS
7 RECOGNITION RESULT DISPLAY MEANS
9 WORD CORRECTION MEANS
11 SPEECH RECOGNITION EXECUTION MEANS
13 CONTINUOUS SOUND DETERMINATION MEANS
12 DATA STORAGE MEANS
15 COMPETITIVE WORD DISPLAY COMMANDING MEANS
17 COMPETITIVE WORD SELECTION MEANS
19 WORD REPLACEMENT COMMANDING MEANS

BEST MODE FOR CARRYING OUT THE INVENTION

A speech recognition system, a speech recognition method, and a program according to an embodiment of the present invention will be described in detail with reference to drawings. FIG. 1 is a block diagram schematically showing function implementation means implemented within a computer when an embodiment of the speech recognition system of the present invention that executes the speech recognition method and the program of the present invention is implemented, using the computer.

A speech recognition system 1 in this embodiment includes speech input means 3 for inputting a speech, speech recognition means 5, recognition result display means 7, and word correction means 9. The speech input means 3 is configured by including a signal converter or the like that converts an analog signal from a microphone to a digital signal that may be used in a signal processing.

The speech recognition means 5 is constituted by speech recognition execution means 11 and continuous sound determination means 13. The speech recognition execution means 11 in the speech recognition means 5 in particular has a speech recognition function of comparing a plurality of words included in the speech input from the speech input means 3 with a plurality of words stored in dictionary means (not shown) provided within data storage means 12, respectively, and determining a most-competitive word candidate having the highest competitive probability as a recognition result from among competitive candidates in respect of each of the plurality of words included in the speech, by means of a predetermined determination method (a speech recognition step of the method of the present invention: execution of the speech recognition function of the program in the present invention). As the "predetermined determination method," various determination methods which are known may be herein employed. As this predetermined determination method, this embodiment adopts a determination method in which a word graph based on inputted speech is divided into a plurality of word segments condensed into a linear format by acoustic clustering, by means of a confusion network; competitive probabilities, which will be described later, are determined for each of the word segments; and then the most-competitive word candidate are determined for each of the word segments.

In order to implement speech correction, effective presentation of competitive candidates on a screen as shown in FIG. 2 is essential. Simply speaking, these competitive candidates should be generated by extracting not only a most likely (probable) word sequence but also a plurality of other candidates from an internal state of the speech recognition execution means 11. However, in the case of continuous speech recognition targeting a large vocabulary in particular, the size of an intermediate representation format indicating the internal state as described above (referred to as an "intermediate result") usually is very large. In order to show how large the intermediate result is, an example of the "word graph", which is the intermediate result commonly used in speech recognition is shown in FIG. 3. The word graph represents a plurality of candidates with probabilities thereof studied in the speech recognition, by a graph structure in which each link indicates a word. FIG. 3 is an actual word graph generated for a comparatively short speech. It can be seen that the structure is complicated and the number of candidates is also enormous. Since the conventional intermediate result such as the word graph cannot explicitly represent a competitive relationship between candidates. Thus, effective candidate presentation such as that for speech correction is impossible. Then, in this embodiment, as a new intermediate result that solves the problem as described above, a confusion network (confusion network) [L. Mangu, E. Brill and A. stolcke, "Finding Consensus in Speech Recognition: Word Error Minimization and Other Applications of Confusion Network", Computer Speech and Language, Vol. 14, No. 4, pp. 373-400, 2000.] that converts the internal state of the speech recognition execution means 11 to a simple and highly accurate network structure is introduced or used. The confusion network is originally a halfway result used in a decoding algorithm in order to improve a speech recognition rate. For this reason, those skilled in the art did not imagine that the confusion network would be applied to error correction as in this embodiment.

Figure 4A:
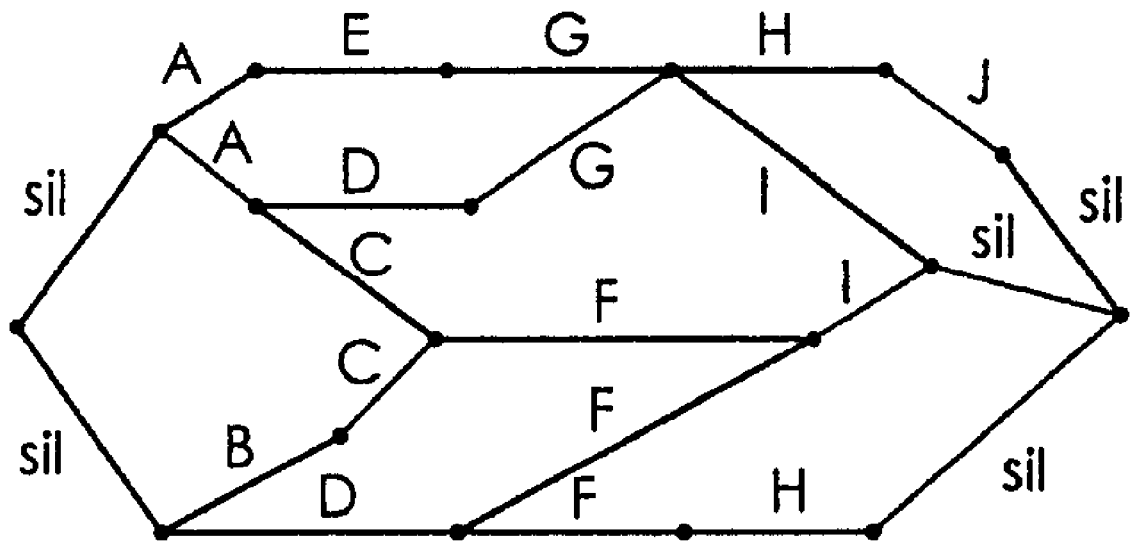
FIG. 4A is a diagram used for explanation when the word graph is subject to acoustic clustering.
Figure 4B:
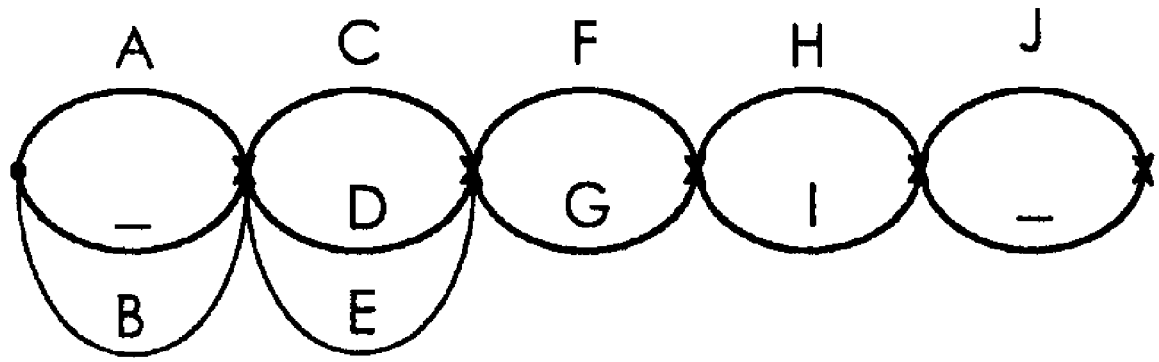
FIG. 4B is a diagram conceptually showing that the word graph has been condensed into a linear format by the clustering.

The confusion network can be obtained by condensing a word graph shown in FIG. 4(A) to a linear format as shown in FIG. 4(B) by acoustic clustering. Referring to FIG. 4(A), "sil" (silence) indicates silence when a speech is started or completed, while an alphabet indicates a name of a word on a link of the graph. A sign "_" on a network in FIG. 4(B) indicates a deletion candidate which will be described later. The acoustic clustering is performed by the following two steps. Incidentally, these steps are introduced in L. Mangu, E. Brill and A. stolcke, "Finding Consensus in Speech Recognition: Word Error Minimization and Other Applications of Confusion Network", Computer Speech and Language, Vol. 14, No. 4, pp. 373-400, 2000).

Intra-word clustering step: links that have the same word name and are temporally overlapping are clustered. Temporal similarity is used as a cost function.

Inter-word clustering step: links with different word names are clustered. Acoustic similarity between words is employed as the cost function.

A posterior probability of each link in the confusion network is calculated for each clustered class (or each word segment). Then, each of calculated posterior probability values represents a probability of existence in each class, or a competitive probability among other candidates in the class. Links in each class are sorted according to the magnitude of the probability of existence, and a link that is more likely as a recognition result is arranged at a higher level. Finally, when a link with the largest posterior probability is selected from each class, a final recognition result (with most likely candidates) as shown in an uppermost stage in FIG. 2 is obtained. When a link with a high posterior probability in each link is picked up, competitive candidates in FIG. 2 are obtained.

In the confusion network, however, each candidate in a class is not always a recognition result in a temporally identical segment. A candidate that temporally extends across two classes, for example, is assigned to one of the two classes. In speech correction in this embodiment, as will be described later, when a user selects such a candidate, a candidate in a neighboring class that has not been selected by the user is also automatically selected so that temporal consistency with an utterance segment is obtained, thereby minimizing the number of correction operations.

The recognition result display means 7 in FIG. 1 has a function of displaying a recognition result recognized by the speech recognition means 5 on a screen not shown as a plurality of word sequences (at a speech recognition result display step: execution of the speech recognition result display function). FIG. 2 is a diagram showing an example of the speech recognition result and an example of correction of the speech recognition result in this embodiment, which are displayed on the screen not shown. The recognition result display means 7 in this embodiment has a function of displaying a result of recognition by the speech recognition means 5 on the screen in real time.

In this case, it is preferable that the word correction means 9 also have a function of displaying a competitive word on the screen in real time, together with display of the recognition result by the recognition result display means 7 on the screen. With this arrangement, correction of speech recognition may be performed concurrently with utterance of the user.

The word correction means 9 has a word correction function of correcting a plurality of most-competitive word candidates each having the highest competitive probability, which form a word sequence displayed on the screen (at a word correction step: execution of the word correction function). The word correction means 9 used in this embodiment is constituted by competitive word display commanding means 15, competitive word selection means 17, and word replacement commanding means 19. The competitive word display commanding means 15 has a competitive word display function of selecting from among competitive candidates one or more competitive words each having a competitive probability close to the highest competitive probability of a corresponding most-competitive word candidate and displaying on the screen the one or more competitive words adjacent to the corresponding most-competitive word candidate (execution of a competitive word display step). More specifically, in this embodiment, one or more competitive words each with the competitive probability close to the competitive probability of the word (most-competitive word candidate having the highest competitive probability) in a word sequence are selected from a large number of competitive candidates and displayed below the word sequence. This word sequence is displayed as a "usual recognition result" and is constituted by the most-competitive word candidate, recognized by the speech recognition means 5. The competitive word selection means 17 has a competitive word selection function of selecting an appropriate correction word from the one or more competitive words displayed on the screen, in response to a manual operation by the user (execution of a competitive word selection step). Then, the word replacement commanding means 19 has a word replacement commanding function of commanding replacement of a most-competitive word candidate (word forming the word sequence as the usual recognition result) recognized by the speech recognition means 5, with the correction word selected by the competitive word selection means 17 (execution of a word replacement commanding step). This function causes the word displayed on the screen by the recognition result display means 7 to be replaced with the correction word. In the examples in FIG. 2, for example, a first word "hot spring/onsen/" includes an error in speech recognition. Among competitive candidates displayed with respect to the first word, a word "speech/onsei/" that has been displayed first has the highest competitive probability among the competitive candidates, and the lower a word is positioned with respect to the word "speech/onsei/", the lower the competitive probability of the word becomes. Among competitive candidates below the word sequence, a blank indicates the deletion candidate which will be described later in detail. When this deletion candidate is selected, a corresponding word in the word sequence is deleted. Assume that the deletion candidate is adopted. Then, the word replacement commanding means 19 should be provided with a function of commanding deletion of the most-competitive word candidate corresponding to the deletion candidate from a result of recognition by the speech recognition means 5, when the deletion candidate is selected. With this arrangement, a false alarm (a word which is not uttered but recognized as if it were uttered, and then displayed) that may often occur in speech recognition may be deleted by an operation which is the same as a competitive word selection operation. Accordingly, the time required for a correction will be further reduced. When a competitive probability is assigned to the deletion candidate as well, a display position of the deletion candidate will not be fixed. For this reason, selection of a competitive word and selection of deletion of a word from the word sequence may be executed at the same level. The time required for the correction by the user may be therefore further reduced.

When correction of a word is performed, a competitive word determined earlier than the correction and displayed on the screen earlier than the correction may become inappropriate in terms of a relationship with the corrected word. Then, it is preferable that the competitive word display commanding means 15 be provided with a function whereby when a word is corrected by the word correction means 9, the corrected word is determined as an originally correct word in the word sequence, obtained by the correction by the user, and one or more competitive words are selected again, after the correction. When this function is provided, the competitive word for a word which has not been corrected yet may be changed to another competitive word suited to the corrected word. As a result, a subsequent correction may be further facilitated. In this case, it is preferable that the competitive word display commanding means 15 be further provided with the following function. In other words, it is preferable that the competitive word display commanding means 15 be provided with the function whereby linguistic connection probabilities between the corrected word and each of two words locatable before and after the corrected word in the word sequence and between the corrected word and each of the one or more competitive words for said each of two words are calculated, one or more competitive words each with the connection probability are selected to display in descending order of the connection probabilities as the one or more competitive words to be displayed on the screen, and the one or more competitive words displayed earlier on the screen are replaced with the selected one or more competitive words, or the selected one or more competitive words are added to the one or more competitive words displayed earlier on the screen.

With this arrangement, together with correction of the word in the word sequence, one or more words that are more appropriate as competitive words for two words adjacent to the corrected word may be displayed. As a result, the correction will be further facilitated.

The function of correcting a competitive candidate described above may be referred to as an automatic correcting function of a candidate that has not been selected yet. More specifically, the above-mentioned function denotes the function whereby when a certain most-competitive word candidate is corrected by the user, a candidate in the vicinity of the certain candidate is also automatically corrected to be optimal. In speech recognition, when a certain word is erroneously recognized, another word subsequent to the certain word is often erroneously recognized, being affected by the erroneous recognition of the certain word (as in erroneous recognition of "speech/onsei/ and input/nyuryoku/" as "hot spring/onsen/ and bathing/nyuyoku/" in FIG. 19, for example, which will be described later). When this function is adopted, linguistic connection probabilities between a candidate currently selected by the user and each of candidates before and after the selected candidate are calculated, and automatic correction for each of candidates before and after the selected candidate is made to select a candidate with the largest linguistic connection probability. Referring to FIG. 19, for example, when the user corrects "onsen" to "onsei", "nyuryoku" having the highest linguistic connection probability with "onsei" is automatically selected. Then, "nyuyoku" is corrected to "nyuryoku". This function allows the number of corrections by the user to be kept to a minimum.

Figure 5:
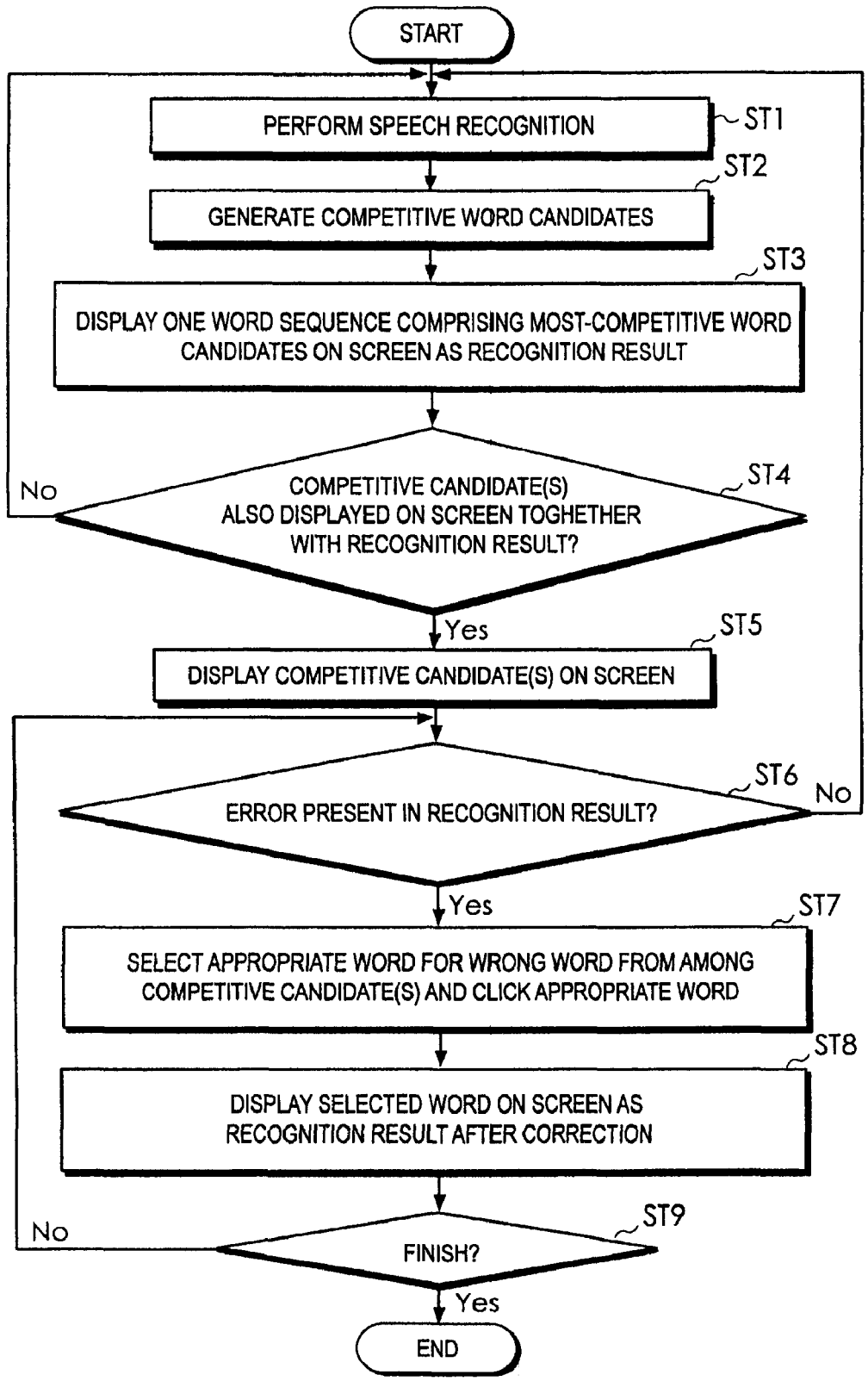
FIG. 5 is a flowchart showing a basic algorithm for an example of a program installed into the computer when the speech recognition method of the present invention is implemented by the computer.

FIG. 5 is a flowchart showing a basic algorithm for an example of the program installed into the computer when the speech recognition method of the present invention is implemented by the computer. In this basic algorithm, a speech is first recognized (in step ST1). Next, competitive candidates are generated, based on a speech recognition result (in step ST2). Then, one word sequence constituted by most-competitive word candidates each with the highest competitive probability is displayed on the screen as the recognition result (in step ST3). Next, one or more competitive words having competitive probabilities close to the highest competitive probabilities of the most-competitive word candidates are selected as competitive candidates for correcting the most-competitive word candidates which constitute the word sequence made by the speech recognition, and it is determined whether the competitive candidates should be displayed on the screen or not (in step ST4). In this program, a noncorrection mode, where no correction is made, is also prepared. Accordingly, in this noncorrection mode, the operation returns from step ST4 to ST1, and only a usual speech recognition result is displayed on the screen. When screen display mode is selected, the one or more competitive words are displayed on the screen adjacent to the most-competitive word candidate (a word having the highest competitive probability) (in step ST5). The user makes determination whether there is an error in the recognition result (in step ST6). When the user determines the need for correction, the operation proceeds to step ST7, and an appropriate correction word is selected from among the one or more competitive words displayed on the screen, in response to a manual operation by the user (in step ST7). As a result, the corresponding most-competitive word candidate recognized by the speech recognition means is replaced with this correction word (in step ST8). When it is determined in step ST6 that there is no need for correction (with no correction operation performed after a lapse of a predetermined time since output of the competitive candidates on the screen), the operation returns to step ST1. When further correction is needed after correction of one word has been completed, the operation returns from step ST9 to step ST6. When there is a speech input, the operation from step ST1 to ST5 is still executed even while the correction is being made. A new word sequence is kept on being displayed on the screen.

Figure 6:
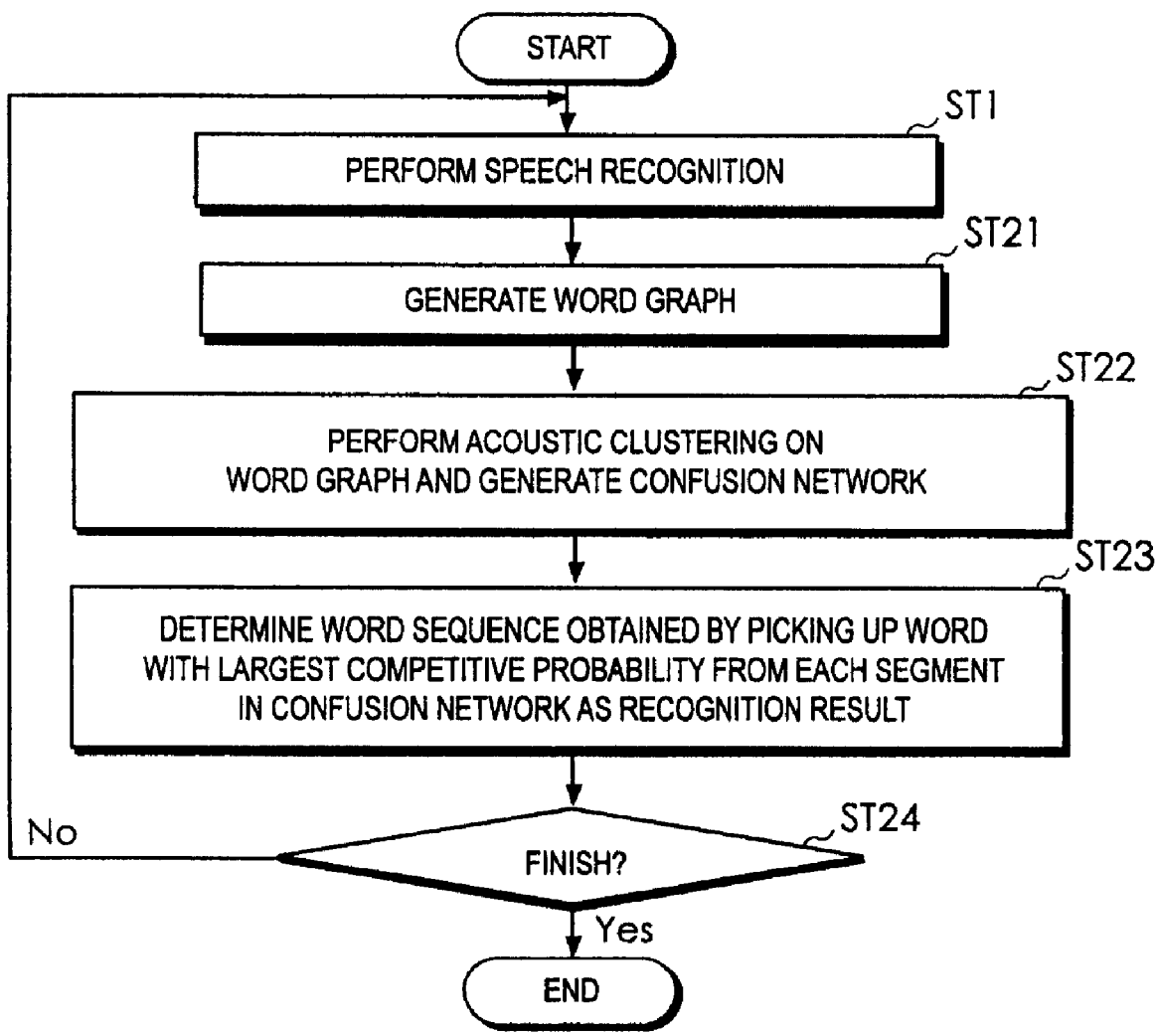
FIG. 6 is a flowchart showing details of step ST2 in FIG. 5, together with step ST1.

FIG. 6 shows details of step ST2 in this embodiment, together with step ST1. In step ST2, a word graph is first generated (in step ST21). Next, acoustic clustering is performed on the word graph, thereby generating a confusion network (in step ST22). Next, a word sequence generated by picking up a word with the largest competitive probability from each word segment in the confusion network is determined as a recognition result (in step ST23). Then when there is no further speech input, the operation is completed (in step ST24).

Figure 7:
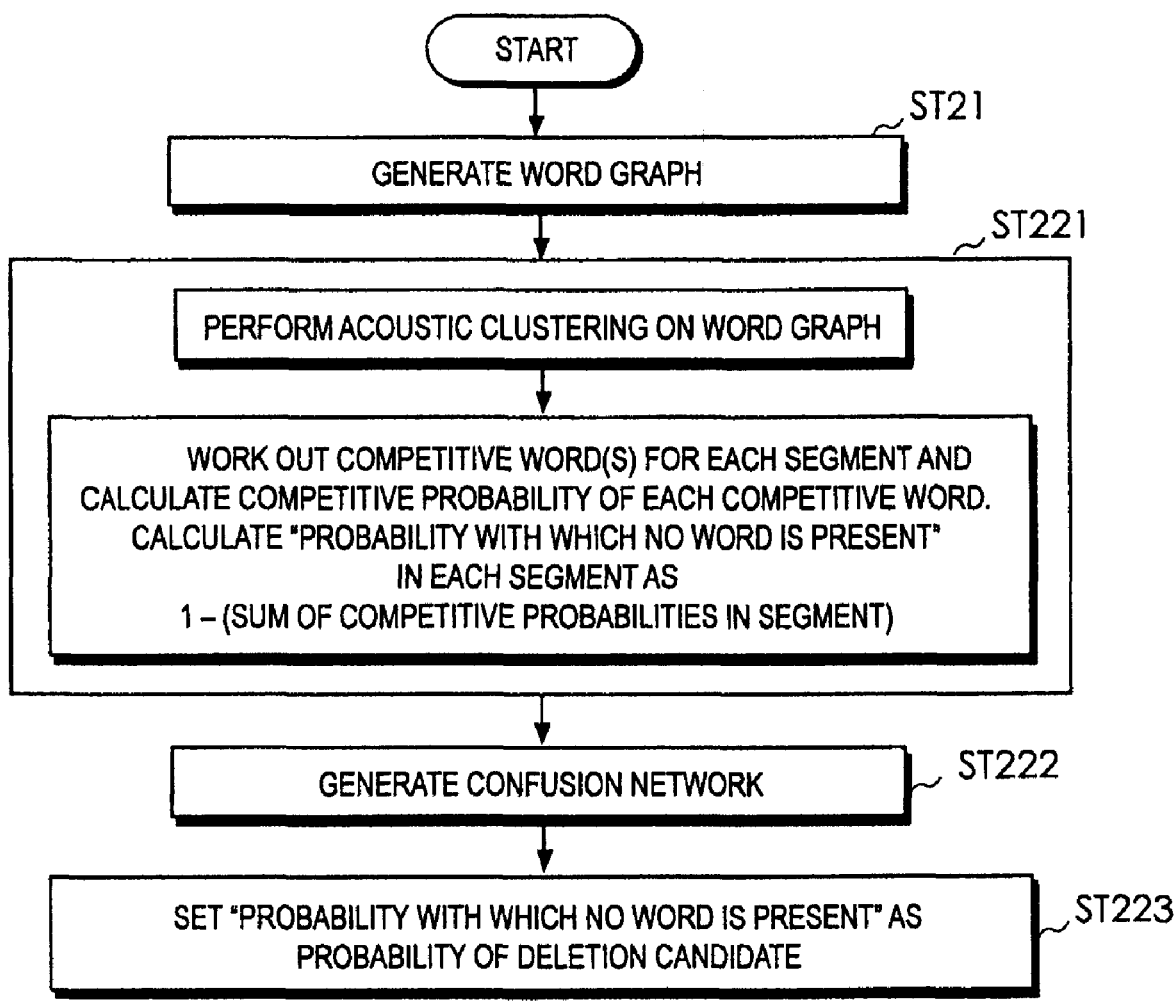
FIG. 7 is a flowchart showing details of a portion of step ST2 when a deletion candidate is introduced.

When the deletion candidate described before is used, it is preferable to employ the confusion network in particular as a determination approach. In this case, a word graph based on a speech input is divided into a plurality of word segments which are condensed into a linear format, by acoustic clustering. Then, competitive probabilities are determined for each of the word segments, and a word with the highest competitive probability is determined. When a sound constituting a portion of one word may be included in both of two word segments, the sound constituting the portion of the one word is included in one of the two word segments. Then, when correction of the word belonging to the one of the two word segments is made by the word correction means 9, the deletion candidate is automatically selected in the other of the two word segments so that temporal consistency may be achieved. FIG. 7 shows details of a portion of step ST2 when the deletion candidate is introduced. In this case, after the word graph has been created (in step ST2), "acoustic clustering is performed on the word graph" in step ST221, and "one or more competitive words for each word segment are worked out. A competitive probability of each of the one or more competitive words is calculated. Then, for each word segment, "a probability with which no word is present" is simultaneously calculated as 1−(a sum of competitive probabilities in each word segment)". Then, the confusion network is generated in step ST222, and "the probability with which no word is present" is set to be the probability of the deletion candidate in step ST223.

Figure 8:
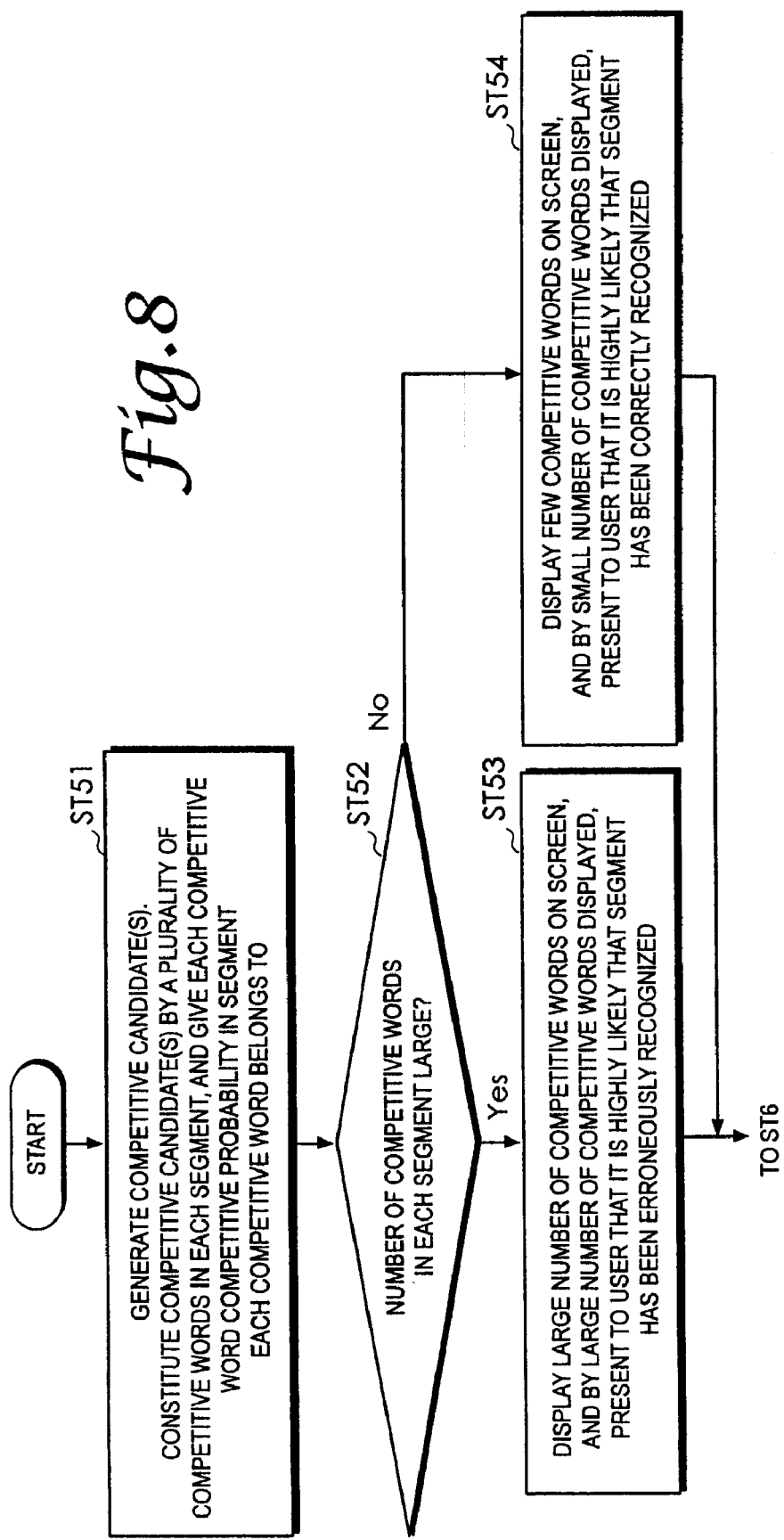
FIG. 8 is a flowchart showing an example of details of step ST5.

FIG. 8 is a flowchart showing an example of details of step ST5 described above. As shown in FIG. 2, in this embodiment, the number of one or more competitive words (competitive candidates) displayed on the screen is not the same for all words. In this embodiment, the lower ambiguity of speech recognition is, the fewer competitive words are displayed. The higher the ambiguity of speech recognition becomes, the more competitive words will be displayed. Then, it is preferable that the competitive word display commanding means 15 is configured to determine the number of competitive words to be displayed on the screen according to a distribution status of competitive probabilities of the competitive words. When there is only one word with a high competitive probability, for example, the one word should be displayed as a competitive word. On the contrary, when there are a large number of words with high competitive probabilities, the number of competitive words to be displayed should be increased in a possible range in view of the distribution status of the competitive probabilities. Then, in step ST5, as shown in FIG. 8, competitive candidates are constituted by a plurality of competitive words in each word segment, and a competitive probability of the word segment to which each of the competitive words belongs is given to each of the competitive words. Then, in step ST52, it is determined whether the number of the competitive words for each word segment is large or not. When the number of the competitive words is large, the competitive words in the large number are displayed on the screen in step ST53, thereby presenting to the user that it is highly likely that the segment has been erroneously recognized, by the large number of the competitive words displayed. When the number of the competitive words is small, few competitive words are displayed on the screen in step ST54, thereby presenting to the user that it is highly likely that the segment has been correctly recognized, by the small number of the competitive words displayed. With this arrangement, necessity of correction may be seen at a glance by the number of displayed competitive words. Thus, it is not necessary for the user to give the same attention to all words included in a word sequence to perform a correction. For this reason, the time required for making determination as to the necessity of correction of a word and performing the correction may be reduced.

In step ST5 that constitutes the competitive word display commanding means 15, it is preferable that the competitive word display commanding means 15 have a function of displaying competitive words on the screen so that the competitive words are displayed in a descending order of competitive probabilities thereof above or below a plurality of words included in a word sequence. When the competitive word display demanding means 15 has such a function, a word required for correction may be easily found, by checking or starting from a competitive word close to the word to be corrected, in a short time. The time for performing a correction may be further reduced.

Figure 9:
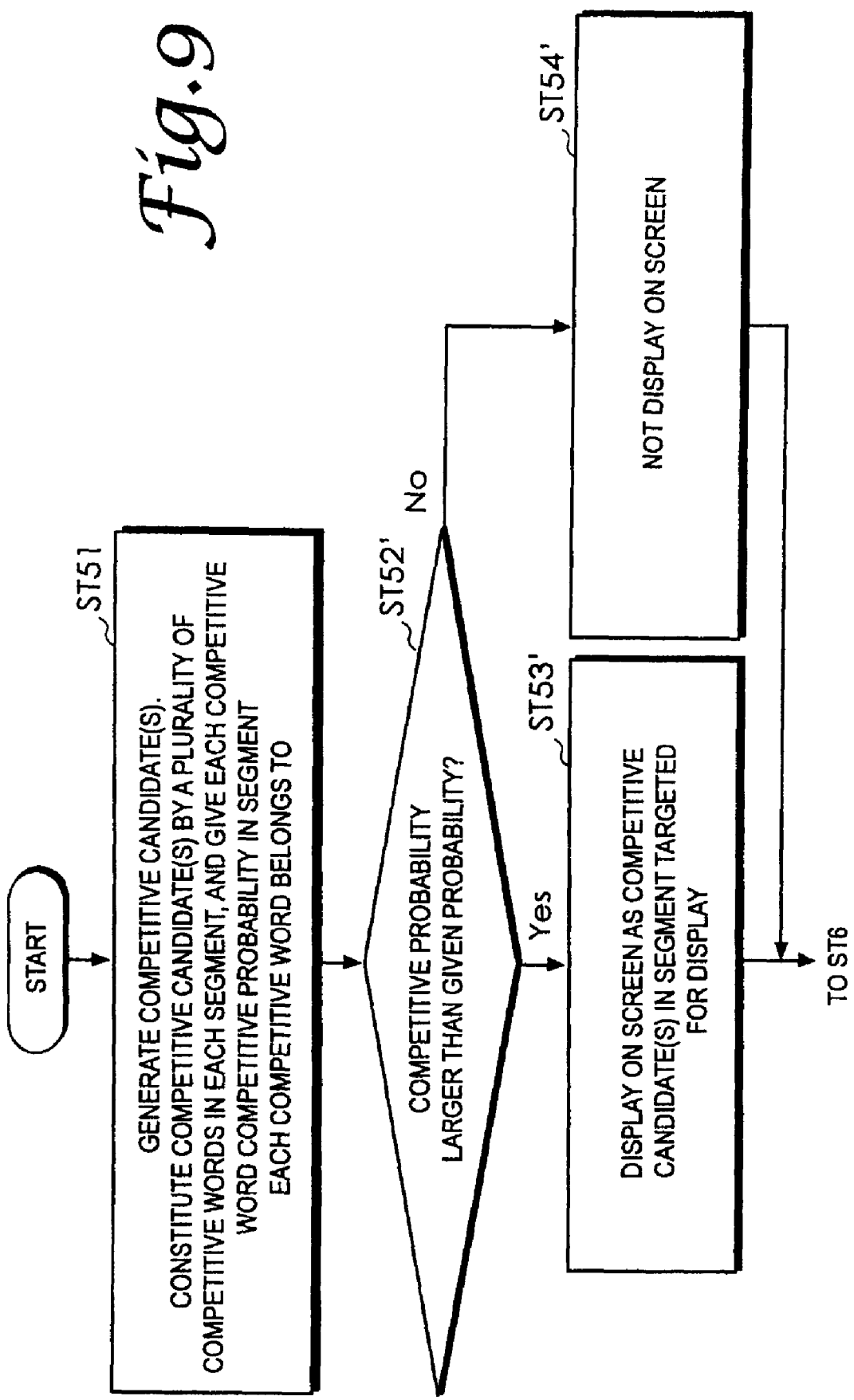
FIG. 9 is a flowchart showing an algorithm for another approach when step ST5 is formed.

FIG. 9 shows an algorithm for another approach for step ST5. In an example in FIG. 9, after competitive probabilities have been given to competitive words, respectively, it is determined in step ST52' whether each competitive probability is larger than a given probability. Then, a competitive word with the competitive probability larger than the given probability is displayed on the screen as a competitive candidate in a segment targeted for display, in step ST53'. When the competitive probability of a competitive word is smaller than the given probability, the competitive word is not displayed on the screen, in step ST54'. Even in this case, the deletion candidate may be displayed.

Figure 10:
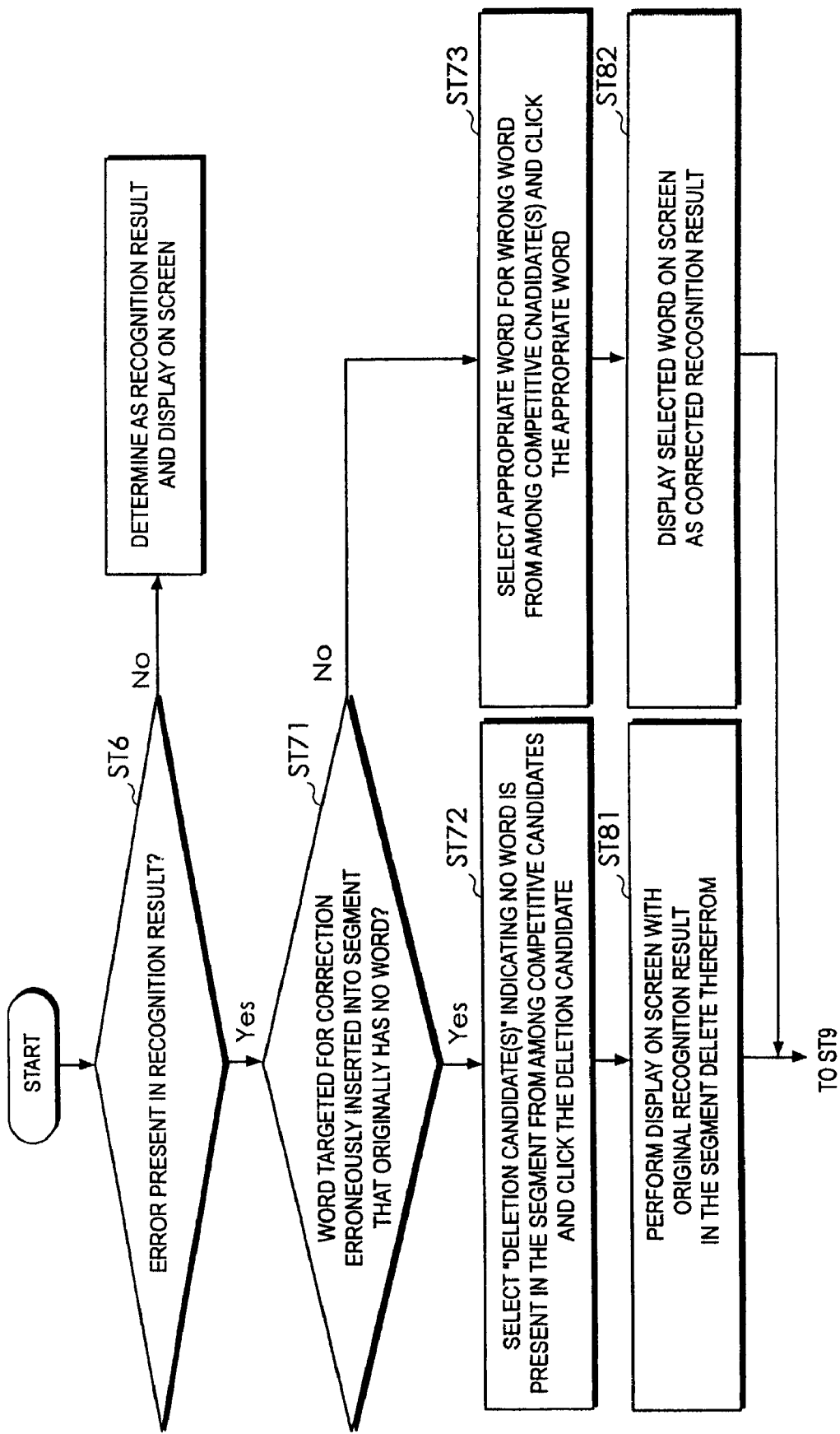
FIG. 10 is a flowchart showing an example of details of steps ST7 and ST8 when the deletion candidate is inserted.
Figure 11:
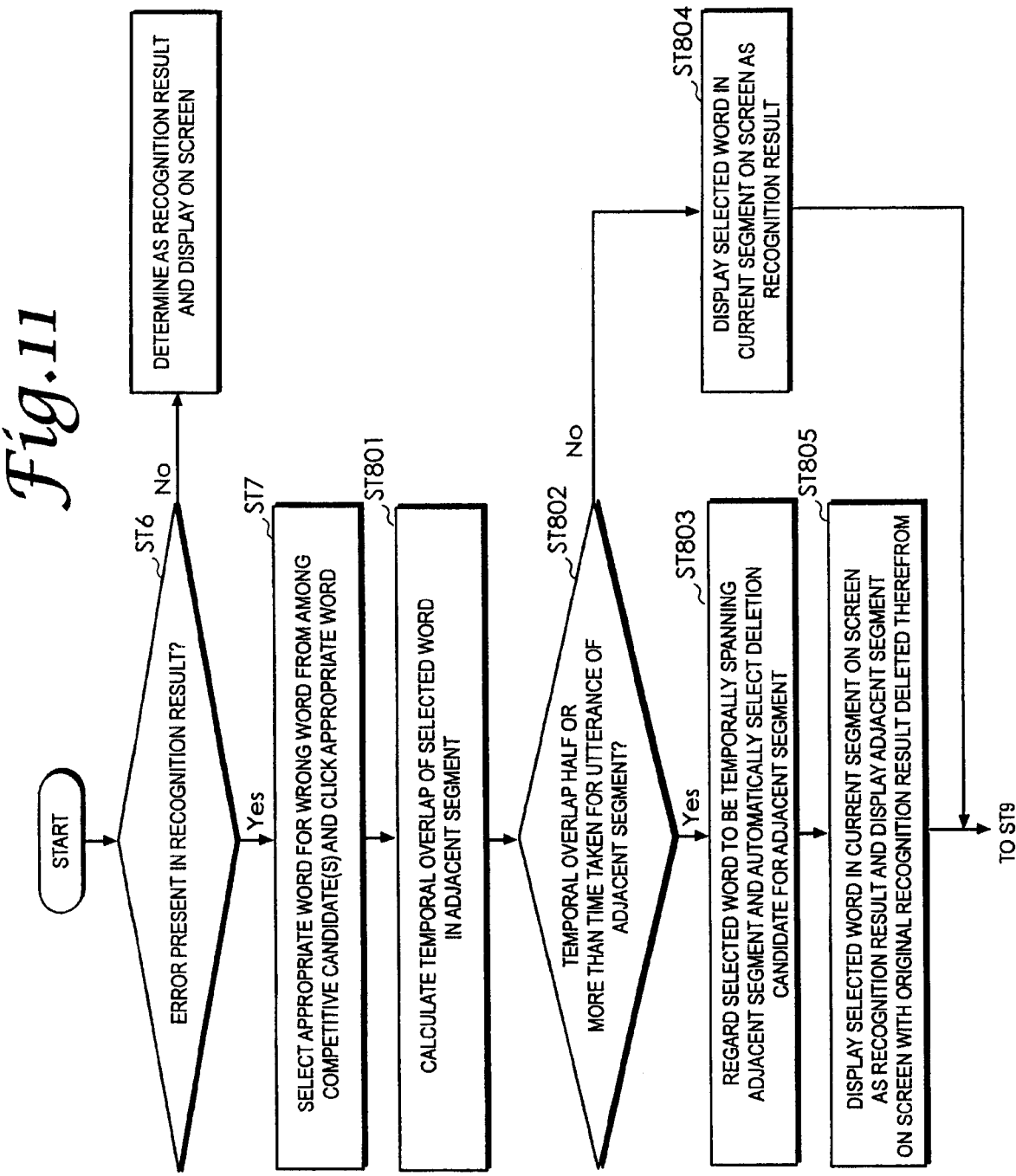
FIG. 11 is a flowchart showing an operation of step ST8 when consideration is given to a case where a sound constituting a portion of one word may be included in both of two word segments.

FIG. 10 shows an example of details of steps ST7 and ST8 when the deletion candidate is inserted. Step ST7 is constituted by steps ST71 through ST73, while step ST8 is constituted by steps ST81 and ST82. In step ST71, it is determined whether a word targeted for correction is the word erroneously inserted into a segment that originally has no word. When the word targeted for correction is erroneously inserted, the operation proceeds to step ST72, and the "deletion candidate" is selected. As a result, the word is deleted from the word sequence. Assume that the word is not erroneously inserted. Then, when an appropriate competitive word is clicked in step ST73, the word in the word sequence is replaced with the selected correction word (in step ST82). FIG. 11 shows details of step ST8 when consideration is given to a case where a sound constituting a portion of one word may be included in both of two word segments. When the selected word is clicked in step ST7, a temporal overlap with a word segment adjacent to the selected word is calculated. Next, it is determined in step ST802 whether the temporal overlap is a half or more than a time taken for utterance of the adjacent word segment or not. When the temporal overlap is the half or less than the time taken for utterance of the adjacent word segment, the selected word is regarded to be temporally spanning the adjacent segment, and the deletion candidate is automatically selected for the adjacent segment, in step ST803. Then, in step ST804, the selected word in a current segment is displayed on the screen as a recognition result, and an original recognition result in the adjacent segment is deleted from the screen and the adjacent segment without the original recognition result is displayed. When the temporal overlap is less than the half of the time taken for utterance of the adjacent word segment, the selected word in the current segment is displayed on the screen as the recognition result, in step ST804.

Figure 12:
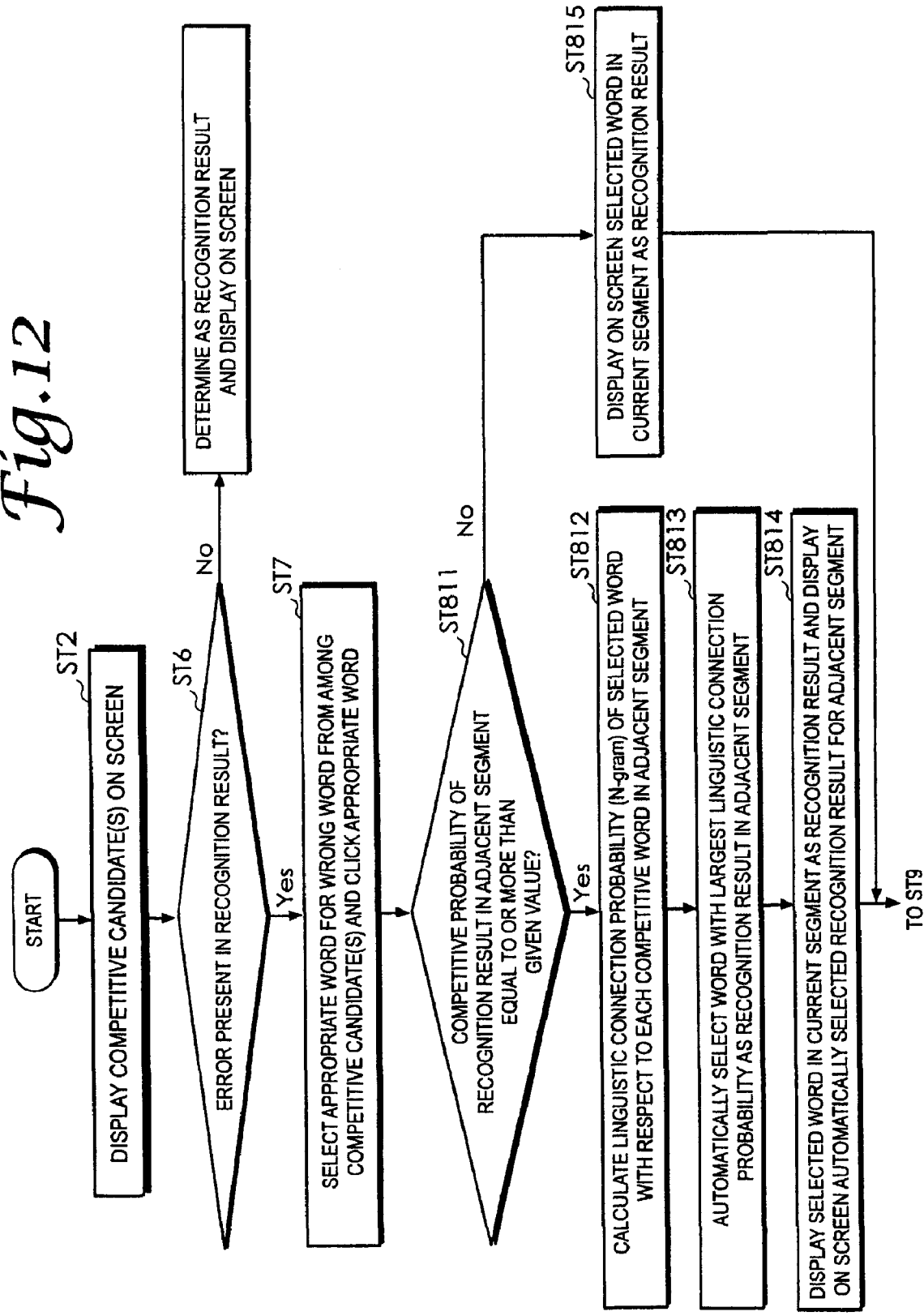
FIG. 12 is a flowchart showing an algorithm for a program of other example when the deletion candidate is automatically selected.

FIG. 12 is a flowchart showing an algorithm for a program of other example when the deletion candidate is automatically selected. In this algorithm it is determined in step STG811 whether the competitive probability of the recognition result in the adjacent word segment is equal to or more than a given value. Then, when the competitive probability is not equal to or more than the given value, the operation proceeds to step ST812, and the linguistic connection probability (N-gram) of the selected word with respect to each competitive word for the adjacent word segment is calculated. Then, in step ST813, the word with the largest linguistic connection probability is automatically selected as a recognition result in the adjacent word segment.

In the embodiment described above, display of a speech recognition result and display of competitive candidates shown in FIG. 2 are performed simultaneously. Accordingly, when an utterance of the user is input, the result as shown in an upper portion of FIG. 2 is immediately presented (or displayed from left to right one after another together with a speech input start). Thus, a correction may be carried out in real time. In the correction operation, being different from conventional speech recognition, below a usual recognition result (word sequence) in the uppermost stage, a list of "competitive candidates" is always displayed, in addition to the usual recognition result. Accordingly, correction may be made by selection from among the competitive candidates. As shown in FIG. 2, the usual recognition result is divided for each word segment, and one or more competitive candidates for the most-competitive word candidate are displayed below the most-competitive word candidate, being aligned. As described before, the number of competitive word candidate in a segment reflects ambiguity of the segment. The more ambiguous a segment is for the speech recognition means 5 and the less confident the speech recognition means is in recognizing the speech segment, the more competitive word candidates are displayed for the segment. Then, the user may carefully watch a segment with a lot of competitive word candidates displayed therein, assuming that there may be erroneous recognition. On the contrary, since a few competitive word candidates displayed for a segment suggest that the speech recognition means 5 is confident in having performed correct speech recognition in that segment, the user will not be brought into unnecessary confusion. By presenting a recognition result as described above, the user may easily correct a recognition error just by performing an operation of "selecting" a correct word from competitive candidates.

Assume that the deletion candidate described before is used, as in this embodiment. Then, even when a false alarm (or erroneous insertion of an unnecessary word into a segment in which the word originally should not be present) is present, the user may delete the false alarm just by selecting the deletion candidate. In other words, replacement and deletion of a word may be executed seamlessly by one "selecting" operation. Competitive candidates in each segment are displayed in the descending order of probability (existence probability). It means that the speech recognition means determines that a competitive candidate in an upper position is more likely to be a correct word. Thus, when the user watches competitive candidates from top to bottom, he can usually reach the correct word quickly. Further, in this embodiment, competitive candidates that are likely to be correct words are comprehensively listed up as recognition results during utterance, and the deletion candidate is also included in each segment. Thus, there is an advantage that a change of a word boundary in a recognition result as proposed in Endo and Terada, "Candidate Selecting Approach for Speech Input" (Interaction Papers 2003, pp. 195-196, 2003.) is also eliminated.

In some conventional speech recognition systems, it sometimes happens that until utterance is completed, a recognition result is not displayed. Even if the result is displayed, other possibility such as competitive candidates is not displayed. Then, until the result is examined after completion of utterance, error correction cannot be started. It is pointed out that for this reason, speech input has a drawback of requiring more time for an error correction operation than keyboard input. In addition to the time required for the correction itself, the following additional times may be pointed out as factors that increase the time for performing the correction:

1) the time for the user to discover an erroneous location, and 2) the time to point out (move a cursor to) the erroneous location.

On contrast therewith, when the speech recognition system in this embodiment is used, an intermediate result of speech recognition with competitive candidates is kept on being fed back in real time during a speech, and selection by the user also becomes possible. An error can be therefore immediately corrected in the middle of the utterance. This arrangement greatly reduces the two times required for the operation described above. Further, there is an advantage that the time required for the actual correction is greatly reduced because the actual correction is made just by selecting an already displayed candidate.

As shown in FIG. 1, the speech recognition means 5 in the embodiment described above has a function of suspending speech recognition by input of a specific uttered by a speaker during speech input and allowing correction by the word correction means 9. The speech recognition means 5 therefore has continuous sound determination means 13 for determining whether an input voice is a continuous sound that continues for a certain time or longer. The speech recognition execution means 11 has a function of suspending speech recognition when this continuous sound determination means 13 determines input of the continuous sound and then proceeding with the speech recognition processing from a state before the suspension when the continuous sound determination means 13 determines input of a sound other than the continuous sound after the determination of the continuous sound. When such a function is added, it becomes possible to smoothly suspend speech recognition, using a filled pause (lengthened pronunciation of a sound pronounced when the speaker chokes up) often made when the speaker chokes up in an ordinary conversation. If such a function is provided, speech recognition may be suspended by pronunciation of a specific sound when it needs time for a correction. The user may therefore perform the correction of a word at his pace, without being impatient.

Figure 13:
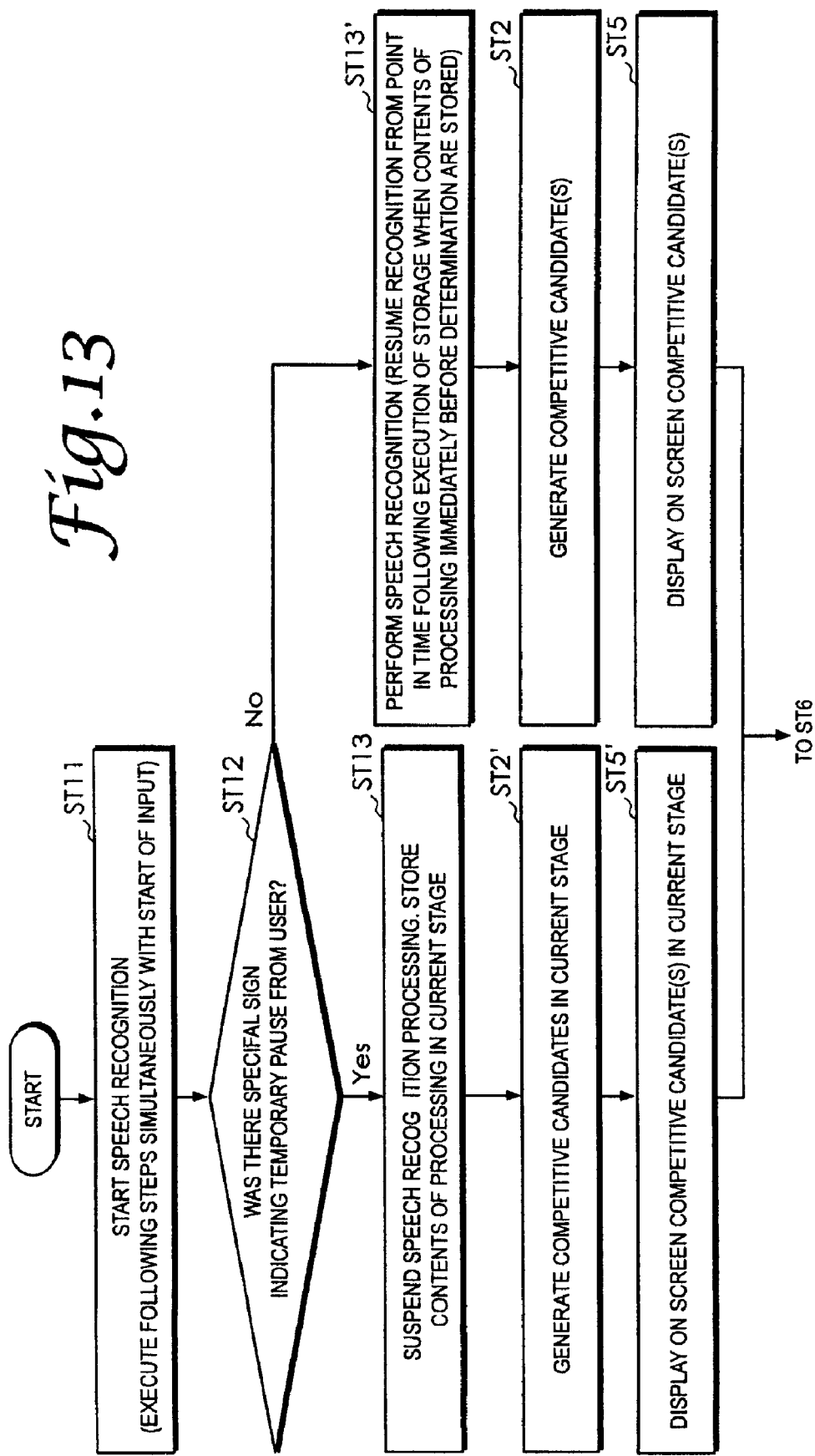
FIG. 13 is a flowchart showing an algorithm for a program for implementing an intentional suspension function.

FIG. 13 shows an algorithm for implementing this function. First, speech recognition is started in step ST11. Then, in step ST12, it is determined whether there has been a special sign (input of a special sound such as a vocalized pause: e.g. input of the continuous sound of "err" indicating a temporary pause from the user. When a result of this determination is YES, the operation proceeds to step ST13, and the speech recognition is suspended. Then, contents of the processing in a current stage are stored. Then, competitive candidates in the current stage are generated in step ST2'. Then, the competitive candidates obtained so far in the current stage are displayed on the screen in step ST5'. In this example, a step corresponding to step ST4 in FIG. 5 is omitted. When it is determined in step ST12 that there has been no special sign, usual speech recognition is performed in step ST13'. When contents of the processing immediately before the determination are stored, the speech recognition is resumed from a point in time following execution of the storage. Then, the operation proceeds to steps ST2 and ST5, and competitive candidates are displayed on the screen. When display of the competitive candidates on the screen is completed, the operation proceeds to step ST6 in FIG. 5. In this case, determination that there is no error in a recognition result is made by a stop of input of the special sign (input of the special sound: e.g. input of the continuous sound of "err"), in step ST6.

A specific method of implementing the intentional suspension function will be described. When a vocalized pause (a filled pause) is detected during speech input and a given silent segment is detected immediately after the vocalized pause, an operation of the speech recognition means 5 is suspended, and a speech recognition process at a current point in time (including hypothesis information, information on a current position in a search space, or the like so far used) is saved. At this point, a segment where the vocalized pause is continued is not targeted for speech recognition, and is skipped. When a start of the speech is detected again (based on power of the speech), speech recognition is resumed or started again at the point where the recognition process has been saved, and the speech recognition is carried on until an end point of the speech is detected. For detection of the vocalized pause, a method to detecting a vocalized pause in real time described in Goto, Itou, and Hayamizu, "A Real-time System Detecting Filled Pauses in Spontaneous Speech" (The Transactions of the Institute of Electronics, Information and Communication Engineers, Vol. J83-D-II, No. 11, pp. 2330-2340, 2000.) may be adopted. In this method, two acoustic characteristics (of small fundamental frequency transition and small spectral envelope deformation) of a vocalized pause (a lengthened vowel) are detected in real time by bottom-up signal processing. For this reason, this method has an advantage that lengthening of an arbitrary vowel may be detected without depending on a language.

When the intentional suspension function is provided, speech recognition may be suspended at a point in time intended by the user during speech input. Then, when a next speech is started, the speech recognition system may be operated as if the speech before the suspension were kept on. In this embodiment, in order to transmit a user's intention to suspend the speech recognition, the vocalized pause [filled pause (prolongation of an arbitrary vowel)], which is one of non-language information in a speech, was adopted as a trigger for the intentional suspension function. This vocalized pause is often made during a person-to-person dialogue as well when a speaker wishes the other party to wait a little or when the speaker will think about something in the course of speaking. Due to this vocalized pause, the user may spontaneously cause the speech recognition to suspend. Then, the user may thereby select a correct candidate or think about a subsequent speech.

Figure 14:
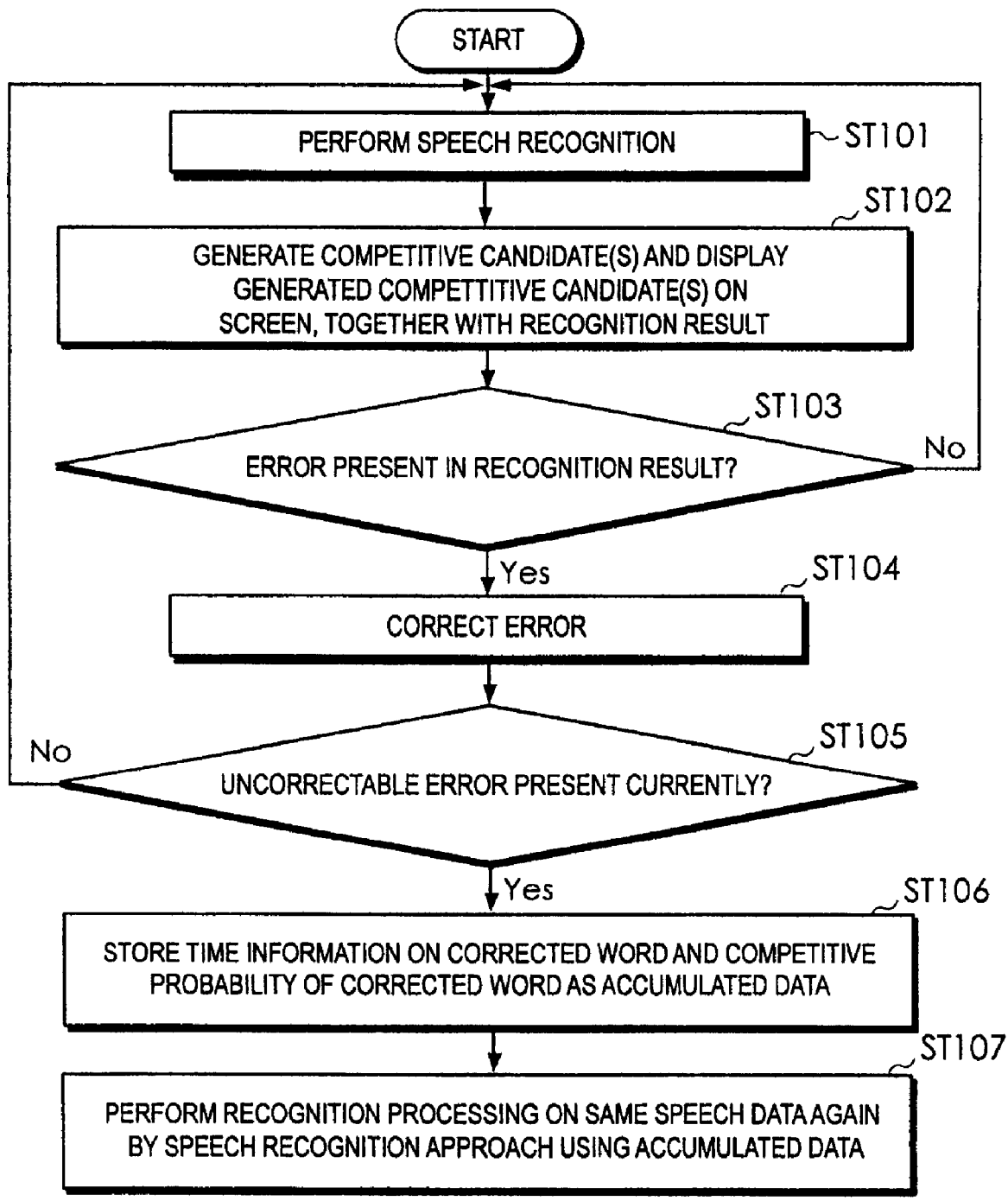
FIG. 14 is a flowchart showing an algorithm for a program for performing a new speech recognition approach.

According to the speech recognition system and the speech recognition method in this embodiment, most of recognition errors may be corrected. However, a problem arises that in regard to a candidate which has not been included in the confusion network, correction on the candidate by selection cannot be performed. In order to improve this problem, it is necessary to increase accuracy of the speech recognition means itself for generating the confusion network. Then, in this embodiment, it is preferable to adopt a new speech recognition approach through decoding that utilizes interaction (herein correction processing) with the user. FIG. 14 is a flowchart showing an algorithm for a program for performing this approach. In this approach, when correction of a speech recognition result is executed by the user, a word after correction and time information, a score for the word (posterior probability), and the like are stored (in step ST106). Then, using this information, decoding (speech recognition on the same speech data) is performed (in step ST107). This realizes a mechanism in which the user actively manipulates internal processing of the speech recognizer through the interaction of error correction and which has not heretofore been present.

Figure 15:
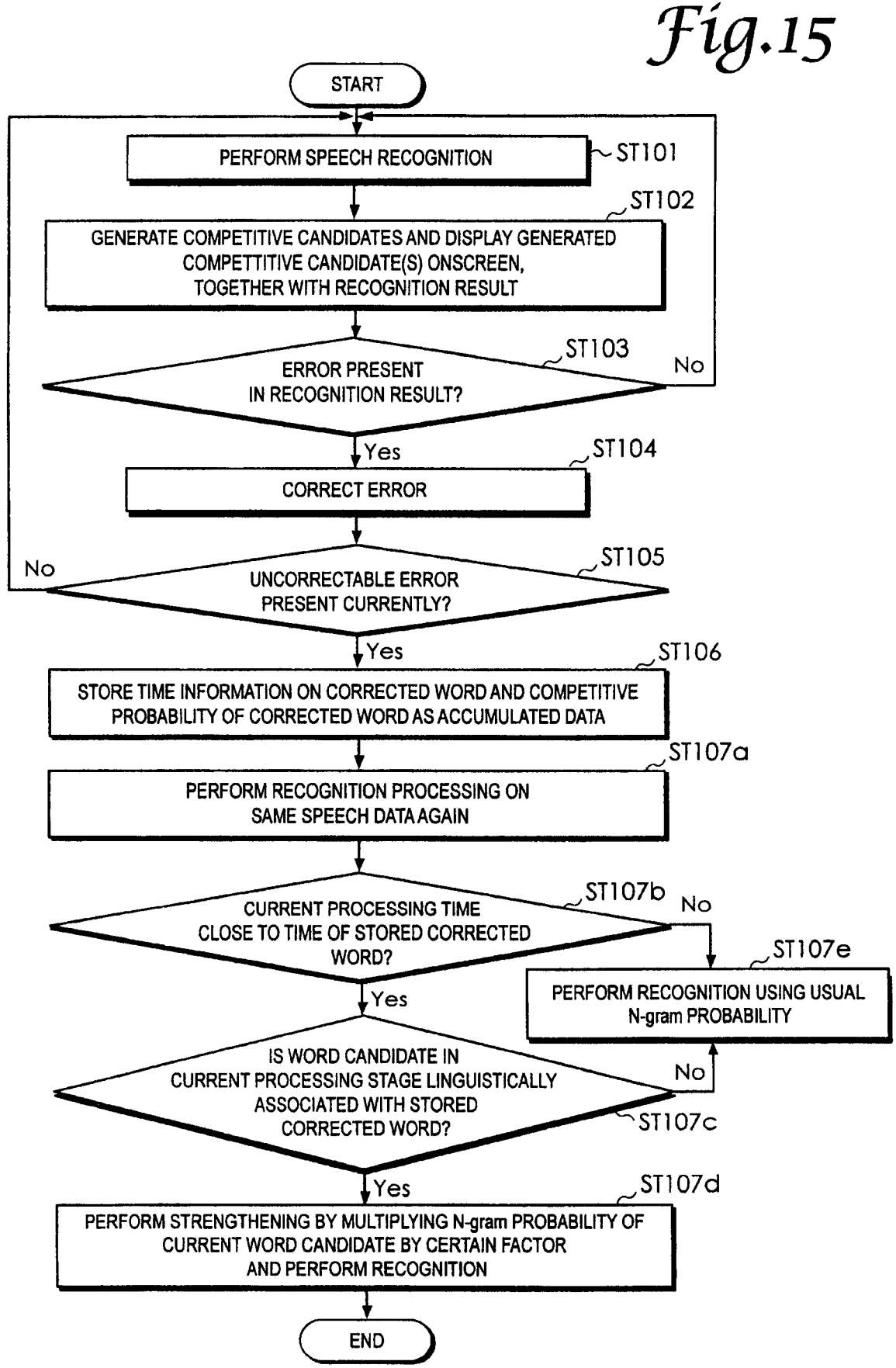
FIG. 15 is a flowchart showing an algorithm for a program when decoding using dynamic strengthening of an N-gram probability of a corrected word is performed.

As one approach to realizing this mechanism, implementation of decoding that utilizes dynamic strengthening of an N-gram probability of a corrected word may be conceived. FIG. 15 is a flowchart showing an algorithm for a program for performing this approach. In this program, a word selected by the user at a time of correction (which is an originally correct word) is indicated by $W_{select}$, a start time of the word $w_{select}$ with respect to an input speech is indicated by Ts, and a finish time of the word $w_{select}$ is indicated by Te. On the other hand, a word candidate at a given time during redecoding after the correction (second-time speech recognition) is indicated by w, a word immediately preceding the word candidate w is indicated by $w_{prev}$, a start time of the word $w_{prev}$ is indicated by ts, and a finish time of the word $w_{prev}$ is indicated by ts. Usually, in the case of a beam search using bigrams, a linguistic score $S_{lm}(w|w_{prev})$ (a logarithmic likelihood) of a current candidate is given as follows:

$$S_{lm}(w|w_{prev}) = \log P(w|w_{prev})$$

In this case, when a condition that $w_{prev} = w_{select}$ and a segment time of the word $w_{prev}$ overlaps with a segment time of the word $w_{select}$ (more specifically, Ts<ts<Te or Ts<te<Te), which is a condition based on information on the word selected by the user at the time of the correction, is satisfied, the linguistic score is changed as follows:

$$S_{lm}(w|w_{prev}) = C \log P(w|w_{prev})$$

in which C (0<C<1) is a weighting factor for a bigram value, and is referred to as an "interaction factor" in the description of this application. As described above, by dynamically strengthening an N-gram probability value of a word obtained by correction by the user during re-decoding after speech correction, a word associated with the word in terms of linguistic constraint may more readily remain within a search beam as a word candidate following the word. By dynamically strengthening (multiplying by a certain factor) the N-gram probability value of the word obtained by correction by the user during the re-decoding after the speech correction as described above, a word associated with the word in terms of linguistic constraint may more readily remain within the search beam as the word candidate following the word. Correction of the word that could not be corrected during original decoding thereby becomes possible.

Next, a highly accurate online adaptive function using correction by the speech recognition system and the speech recognition method of the present invention will be described. In a common speech recognition system in a current state, it is difficult to perform robust and highly accurate recognition for an unspecified speaker and an unspecified task. A technique of adapting a model used in the recognition system to a speaker and an environment is therefore essential. In a real environment in particular, a frequent change in the speaker and a usage environment often occurs. Accordingly, a speech recognition system capable of performing online sequential adaptation is desired. Common online adaptive processing processes will be shown below:

1 Re-cognition of an input voice (speech) is performed, using an existing model.

2 Based on a recognition result, a teacher signal (indicating a speech content text) is generated.

3 Based on the generated teacher signal, adaptation is performed using an MLLR or a MAP, thereby updating an acoustic model.

4 Using the updated acoustic model, a subsequent speech is recognized.

In such online adaptation, the teacher signal is automatically generated by the recognition using the existing model. Thus, the speech context text becomes "incomplete" due to an error in the recognition. As a result, performance of the adaptation would be greatly degraded. On contrast therewith, in the speech recognition system in this embodiment, online adaptation is incorporated into a correction framework of speech recognition, thereby allowing implementation of robust recognition for the speaker and the environment. In correction of a speech recognition result in this embodiment, correction of a recognition error may be performed efficiently and in real time. By using a recognition result corrected by the user as the teacher signal, highly accurate adaptive processing with a "complete" speech content text becomes possible. The speech recognition system in this embodiment may implement in real time a series of processing of "recognition", "correction", and "online adaptation", each of which has often been hitherto operated off-line.

Figure 16:
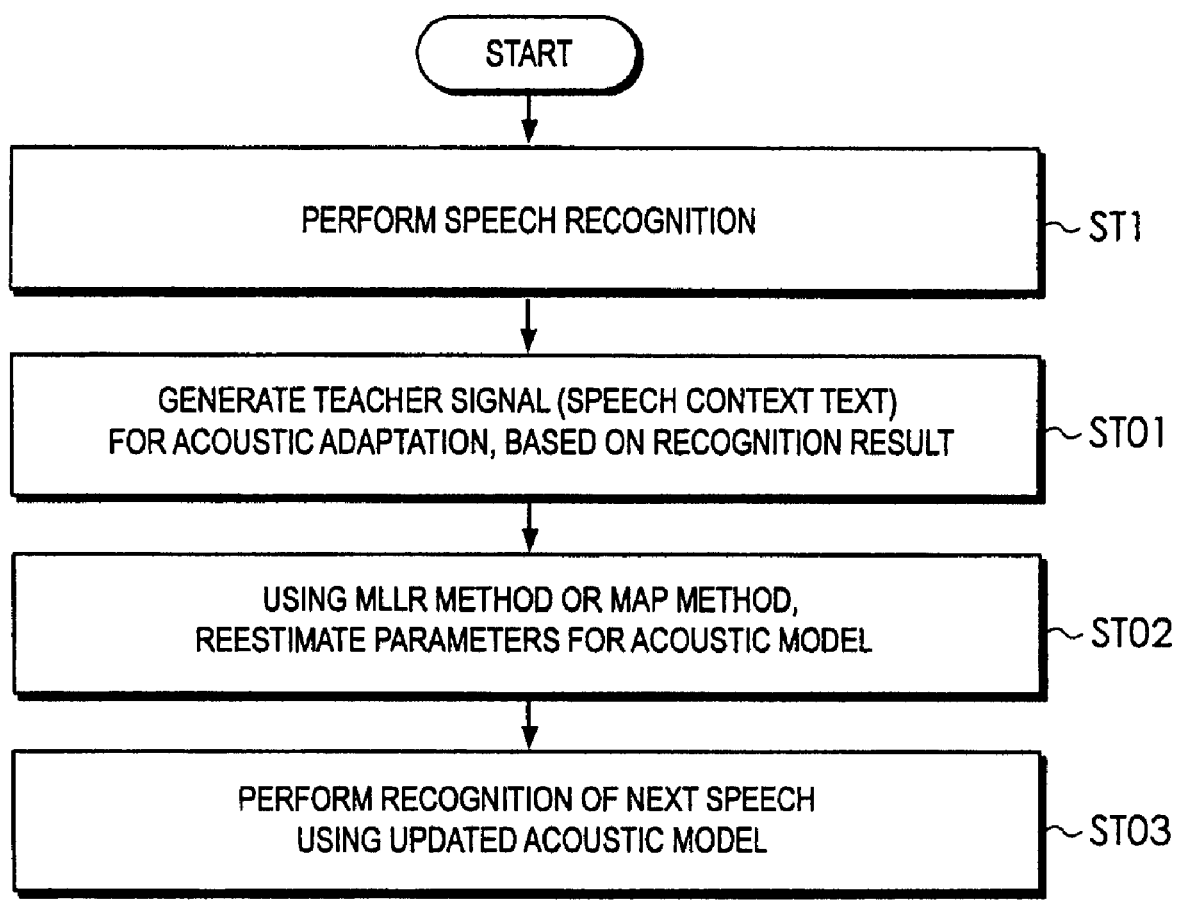
FIG. 16 is a flowchart showing an algorithm when acoustic adaptive processing means is provided at speech recognition means.
Figure 17:
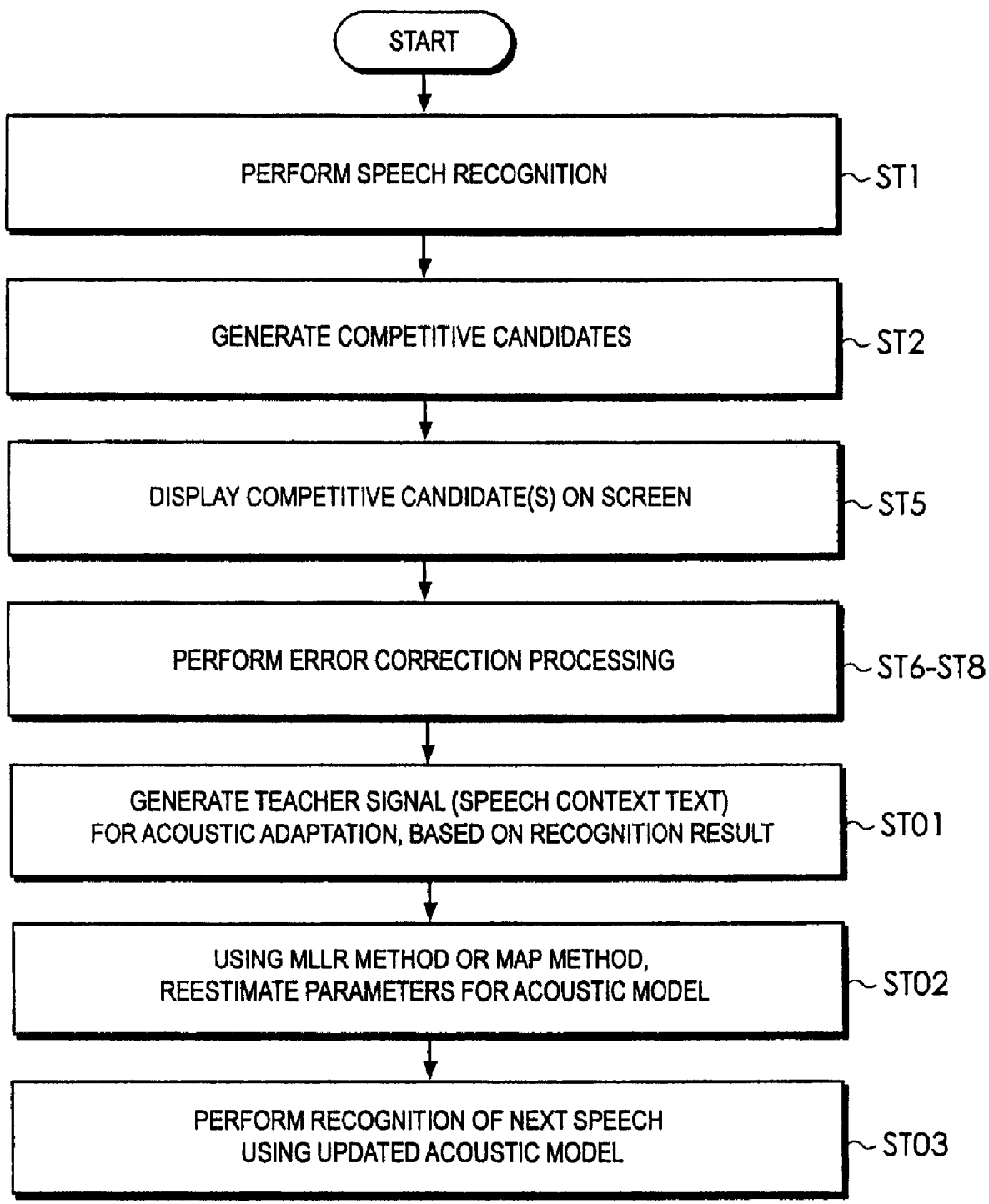
FIG. 17 is a flowchart showing an algorithm when the acoustic adaptive processing means is applied to the embodiment shown in FIG. 1.

FIG. 16 is a flowchart showing an algorithm when acoustic adaptive processing means is provided at the speech recognition means 5 according to the concept described above. FIG. 17 is a flowchart showing an algorithm when this acoustic adaptive processing means is applied to the embodiment shown in FIG. 1. When a speech is input, the acoustic adaptive processing means performs recognition processing. At the same time, the acoustic adaptive processing means performs online acoustic adaptive processing using a recognition result obtained from recognition processing as the teacher signal (in steps ST01 to ST03). As shown in FIG. 17, this acoustic adaptive processing means generates in real time the teacher signal that is free of a recognition error and is therefore accurate when correction is performed by the word correction means 9 (in step ST2 and steps ST5 to ST8), thereby exhibiting a highly accurate acoustic adaptive function.

Figure 18:
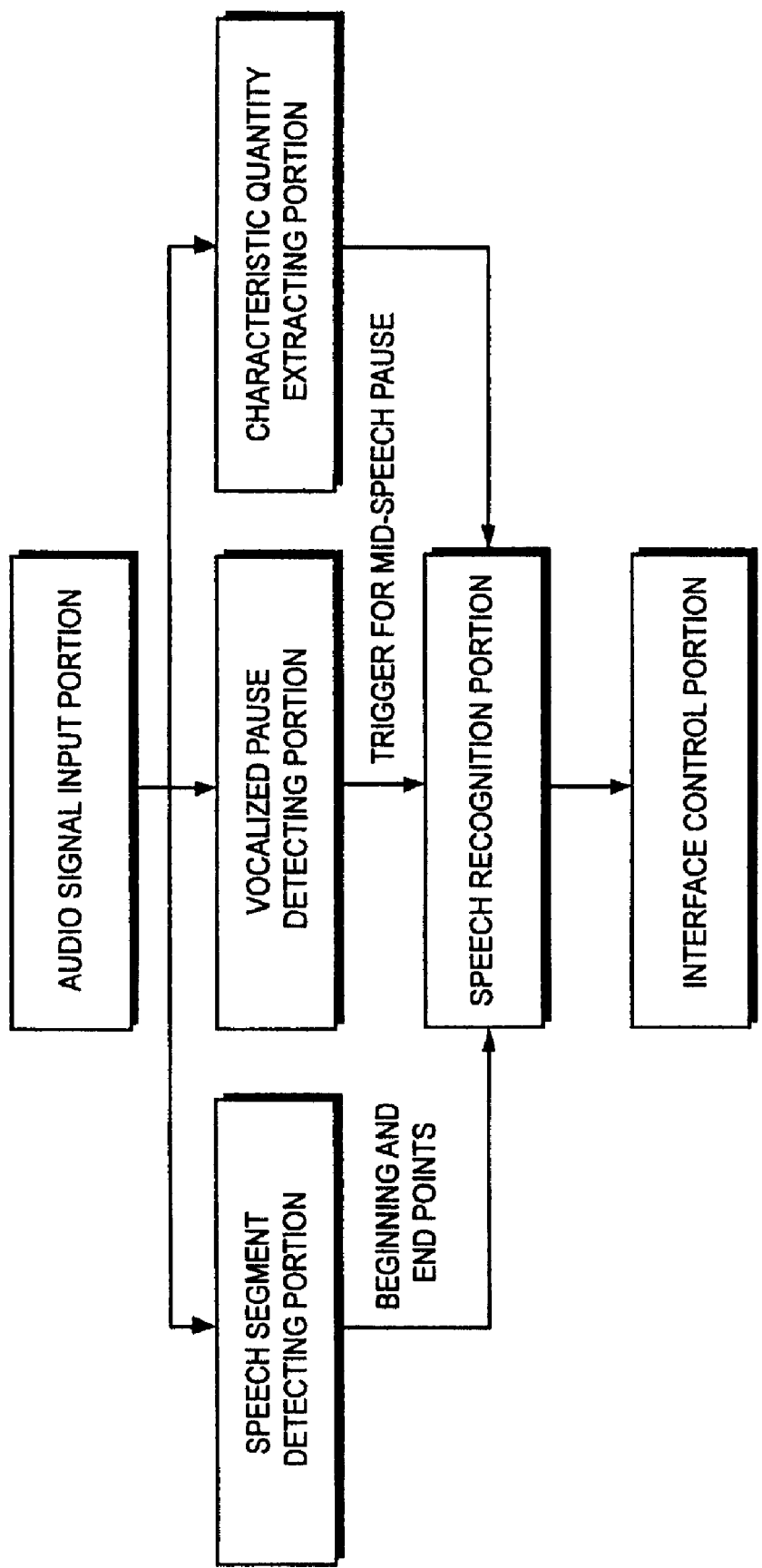
FIG. 18 is a diagram showing system components (processes) of an interface and a flow of overall processing.

Next, a test system of an interface that has specifically carried out this embodiment and a result of test will be described. FIG. 18 shows system components (and processes) of the interface and a flow of overall processing. Referring to FIG. 18, the processes are shown within blocks in the drawing, and may be distributed among a plurality of computers on a network (LAN) and executed by the computers. A network protocol RVCP (Remote Voice Control Protocol) [described in Goto, Itou, Akiba, and Hayamizu, "Speech Completion: Introducing New Modality Into Speech Input Interface" (Computer Software, Vol. 19, No. 4, pp. 10-21, 2002.) that allows efficient sharing of speech language information on the network was employed for communication between the processes.

A flow of the processing will be described. First, acoustic signals input through a microphone or the like to an audio signal input portion are transmitted on the network as a packet. A characteristic quantity extracting portion (included in the speech recognition means 5 in FIG. 1), a vocalized pause detecting portion (corresponding to the continuous sound determination means 13 in the speech recognition means 5 in FIG. 1), and speech segment detecting portion (included in the speech recognition means 5 in FIG. 1) receive the packet simultaneously, and obtain an acoustic characteristic quantity (MFCC), a vocalized pause, and beginning and end points of a speech, respectively. Information on these items is transmitted to a speech recognition portion (corresponding to the speech recognition execution means 11 in FIG. 1) as packets, and recognition processing is performed. In this case, the vocalized pause is used as a trigger for invoking the intentional suspension function. In the speech recognition portion, a confusion network is generated as an intermediate result, and information on the confusion network is transmitted to an interface control portion (included in the word correction means 9 in FIG. 1) as a packet. The interface control portion causes competitive candidates to display, and allows selection of a competitive candidate by clicking using a mouse or an operation of touching a panel by a pen or a finger.

In the test system, syllable-based models trained from the JNAS newspaper article read speech corpus [described in Ogata and Ariki, "Syllable-Based Acoustical Modeling for Japanese Spontaneous Speech Recognition" (The transactions of the Institute of Electronics, Information and Communication Engineers, Vol. J86-D-II, No. 11, pp. 1523-1530, 2003.) (with the number of the models being 244, and the number of mixtures per state being 16) were employed as the acoustic model. As a language model, a 20K word bigram trained from a newspaper article text from among CSRC software of 2000 version [described in Kawahara et al., "Product Software of Continuous Speech Recognition Consortium: 2000 version" (Information Processing Society of Japan SIG Technical Report, 2001-SLP-38-6, 2001.)] was used. As the speech recognition execution means used in the test system, the means was employed that had been enhanced to generate the confusion network on a real-time basis, using an efficient N-best search algorithm [described in Ogata and Ariki, "An Efficient N-best Search Method Using Best-word Back-off Connection in Large Vocabulary Continuous Speech Recognition" (The Transactions of the Institute of Electronics, Information and Communication Engineers, Vol. 84-D-II, No. 12, pp. 2489-2500, 2001)].

FIGS. 19A and 19B show display screens when the intentional suspension function is not used, respectively. FIGS. 20A through 20D show display screens when the intentional suspension function is used, respectively. In this test system, an additional sentence is added above a display portion corresponding to a display in FIG. 2 (referred to as a "candidate display portion"). This portion displays the final result of a speech input after candidates have selected and correction has been performed. In the candidate display portion, the background of a word being currently selected is colored. When no word is selected, a most likely word sequence in the uppermost stage of the candidate display portion is selected. When the user selects other candidate by clicking, not only the background of the candidate is not colored, but also the final result of a speech input in the uppermost portion of the screen is also rewritten (though in FIGS. 19 and 20, only the color for a character or characters in a portion corrected by a selection operation is changed and displayed, making it clearer to see).

Next, a result of evaluation of basic performance of correction of a speech recognition result and an operation result of the implemented interface will be described.

[Basic Performance of Speech Correction]

In order to evaluate whether speech correction can be practically used, it becomes important to investigate to which degree recognition error correction is possible, or to what extent correct words that should originally have been output are included in displayed competitive candidates. Then, a recognition rate after correction (a final speech input success rate) when top-ranking N candidates ranking high in competitive probabilities thereof for a total of 100 speeches made by 25 males have been presented was evaluated as error correction capability. More specifically, when N is five, the recognition rate herein is expressed by a rate at which correct words are included in top-ranking five candidates. Ordinary recognition performance (recognition rate when N is one) was 86.0%.

Figure 21:
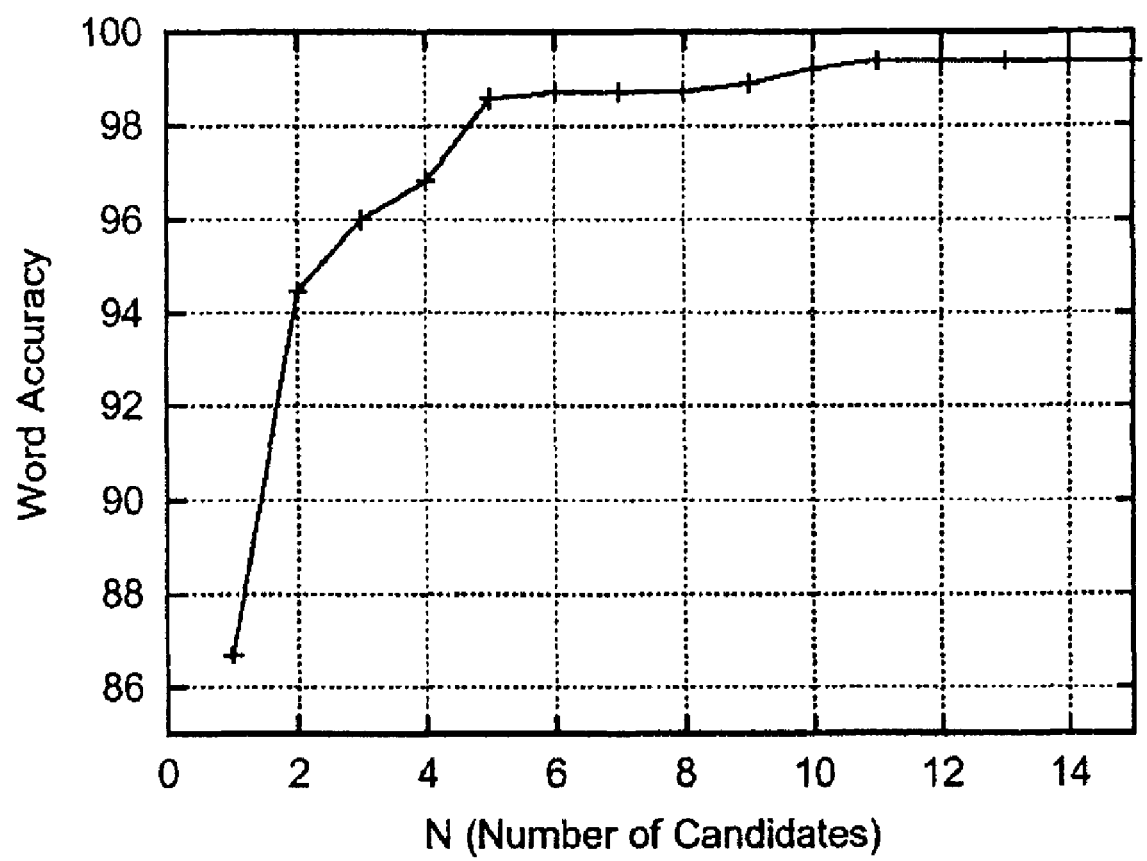
FIG. 21 is a graph showing a recognition rate for each value of N.

FIG. 21 shows the recognition rate for each value of N. An experimental result has shown that when the number of presented candidates is increased, the recognition rate is enhanced, and saturates when N is 11 or more. The recognition rate at this point is 99.36%, indicating that approximately 95% of errors (199 errors) among all errors (209 errors) in a usual speech recognition result may be corrected. When 10 words that could not be corrected were investigated, it was found that four of the words were so-called unknown words which are not registered in a word dictionary used for speech recognition. Further, it was also found that when N was five, most errors could be corrected.

In conventional speech correction, when the number of presented candidates is too large, the user will be confused. On the contrary, when the number of presented candidates is too small, error correction may not be performed. It was found that through the use of the confusion network, correction of almost all errors may be performed while reducing the number of presented competitive candidates. However, as shown in the experiment as well, correction of an unknown word that is not known by the speech recognition system cannot be currently made even if speech recognition is used. It is considered that solution to this problem is a challenge in the future, and that a framework for eliminating unknown words through further interaction with the user will be demanded.

[Operation Result]

After four users actually read a sentence in a newspaper article, the test system (interface) performed correction on the read sentence. It was confirmed that none of the users were confused by presented competitive candidates, and that the correction could be performed appropriately. An impression was obtained that the intentional suspension function using a filled pause was appropriately used and that if this function was used especially when a long sentence was input, work at a time of the input was reduced. Further, it was evaluated that a method of using the interface involved only a selection operation and was simple, and that a GUI was intuitive and was easy to understand. It was found that actually, the user that saw others using the interface could immediately use the interface without being trained.

In the embodiment described above, selection of a competitive word is made using a mouse. When the present invention is carried out using a portable terminal system MB such as a PDA as shown in FIG. 22, selection of a competitive word should be performed using a touch pen TP as input means.

3 SPEECH INPUT MEANS
19 WORD REPLACEMENT COMMANDING MEANS
17 COMPETITIVE WORD SELECTION MEANS
5 SPEECH RECOGNITION MEANS
13 CONTINUOUS SOUND DETERMINATION MEANS
11 SPEECH RECOGNITION EXECUTION MEANS
12 DATA STORAGE MEANS
15 COMPETITIVE WORD DISPLAY COMMANDING MEANS
9 WORD CORRECTION MEANS
7 RECOGNITION RESULT DISPLAY MEANS

The invention claimed is:

1. A speech recognition system comprising:
speech input means for inputting a speech;
speech recognition means for comparing a plurality of words included in the speech inputted from the speech input means with a plurality of words stored in dictionary means, respectively, and determining a most-competitive word candidate having a highest competitive probability as a recognition result from among competitive candidates in respect of each of the plurality of words included in the speech, by means of a predetermined determination method, wherein the predetermined determination method is a method where a word graph based on the inputted speech is divided into a plurality of word segments condensed into a linear format by acoustic clustering, by means of a confusion network, the competitive probabilities are determined for each of the word segments, and then the most-competitive word candidates are determined for each of the word segments;
recognition result display means for displaying the recognition result recognized by the speech recognition means on a screen as a word sequence comprising the most-competitive word candidates; and
word correction means for correcting the most-competitive word candidate in the word sequence displayed on the screen, the word correction means comprising:
competitive word display commanding means that selects one or more competitive words having competitive probabilities close to the highest competitive probability of the most-competitive word candidate from among the competitive candidates and displays the one or more competitive words adjacent to the most-competitive word candidate on the screen;
competitive word selection means that selects an appropriate correction word from the one or more competitive words displayed on the screen in response to a manual operation by a user; and
word replacement commanding means that commands the speech recognition means to replace the most-competitive word candidate recognized by the speech recognition means with the appropriate correction word selected by the competitive word selection means,
wherein the competitive word display commanding means reduces the number of the competitive words to be displayed on the screen when the number of the competitive words having the competitive probabilities close to the highest competitive probability of the most-competitive word candidate is small, and increases the number of the competitive words to be displayed on the screen when the number of the competitive words having the competitive probabilities close to the highest competitive probability of the most-competitive word candidate is large,
wherein the competitive word display commanding means has a function of displaying the competitive words so that the competitive words are displayed in descending order of the competitive probabilities above or below the most-competitive word candidate included in the word sequence,
wherein the competitive word display commanding means has a function of adding in the competitive words a deletion candidate that allows selecting deletion of one of the most-competitive word candidates from the recognition result because the one of the most-competitive word candidates is unnecessary,
wherein a competitive probability is given to the deletion candidate as well, and
the word replacement commanding means has a function of commanding the speech recognition means to delete the most-competitive word candidate corresponding to the deletion candidate from the recognition result recognized by the speech recognition means, when the deletion candidate is selected.

2. The speech recognition system according to claim 1, wherein
when a sound constituting a portion of the word may be included in both of two of the word segments, the sound constituting the portion of the word is included in one of the two word segments, and when the word belonging to the one of the two word segments is corrected by the word correction means, the deletion candidate is automatically selected for the other of the two word segments so that temporal consistency is achieved.

3. The speech recognition system according to claim 1, wherein the recognition result display means has a function of displaying the recognition result on the screen in real time; and
the word correction means has a function of displaying the one or more competitive words on the screen in real time, together with the display of the recognition result recognized by the recognition result display means on the screen.

4. The speech recognition system according to claim 1, wherein the competitive word display commanding means has a function whereby when the one of the most-competitive word candidates is corrected by the word correction means, the corrected word obtained by the correction by the user is determined as an originally correct word in the word sequence, and one or more competitive words are selected again.

5. The speech recognition system according to claim 4, wherein the competitive word display commanding means has an additional function whereby linguistic connection probabilities between the corrected word and each of two words locatable before and after the corrected word in the word sequence and between the corrected word and each of the one or more competitive words for said each of two words are calculated, one or more competitive words each with the connection probability are selected to display in descending order of the connection probabilities as the one or more competitive words to be displayed on the screen, and the one or more competitive words displayed earlier on the screen are replaced with the selected one or more competitive words, or the selected one or more competitive words are added to the one or more competitive words displayed earlier on the screen.

6. The speech recognition system according to claim 1, wherein the speech recognition means has an additional function of storing the word corrected by the word correction means, information on a correction time, and a posterior probability of the corrected word as accumulated data, and performed the speech recognition again using the accumulated data.

7. The speech recognition system according to claim 6, wherein the speech recognition means has a function of storing the word corrected by the word correction means and positional or time information in the word of the inputted speech, and dynamically strengthening a linguistic probability of the word with the stored positional or time information in the speech recognition performed again, thereby facilitating recognition of a word associated with the word.

8. The speech recognition system according to claim 1, wherein the speech recognition means has a function of suspending speech recognition by input of a specific sound uttered by a speaker during input of the speech, and allowing correction by the word correction means.

9. The speech recognition system according to claim 1, wherein the speech recognition means includes:

continuous sound determination means for determining that the inputted speech is a continuous sound continuing for a given time or more; and the speech recognition means has a function of suspending the speech recognition when the continuous sound determination means determines input of the continuous sound, and resuming the speech recognition from a state before the suspension when the continuous sound determination means determines input of a sound other than the continuous sound after the determination of the continuous sound by the continuous sound determination means.

10. The speech recognition system according to claim 1, wherein the speech recognition means further includes acoustic adaptive processing means for performing speech recognition processing and also performing online acoustic adaptive processing using the recognition result of the speech recognition processing as a teacher signal, when the speech is input.

11. The speech recognition system according to claim 10, wherein the acoustic adaptive processing means has a highly accurate acoustic adaptive function through real-time generation of the teacher signal free of a recognition error and being accurate by the word correction means.

\* \* \* \* \*